Figure 8:
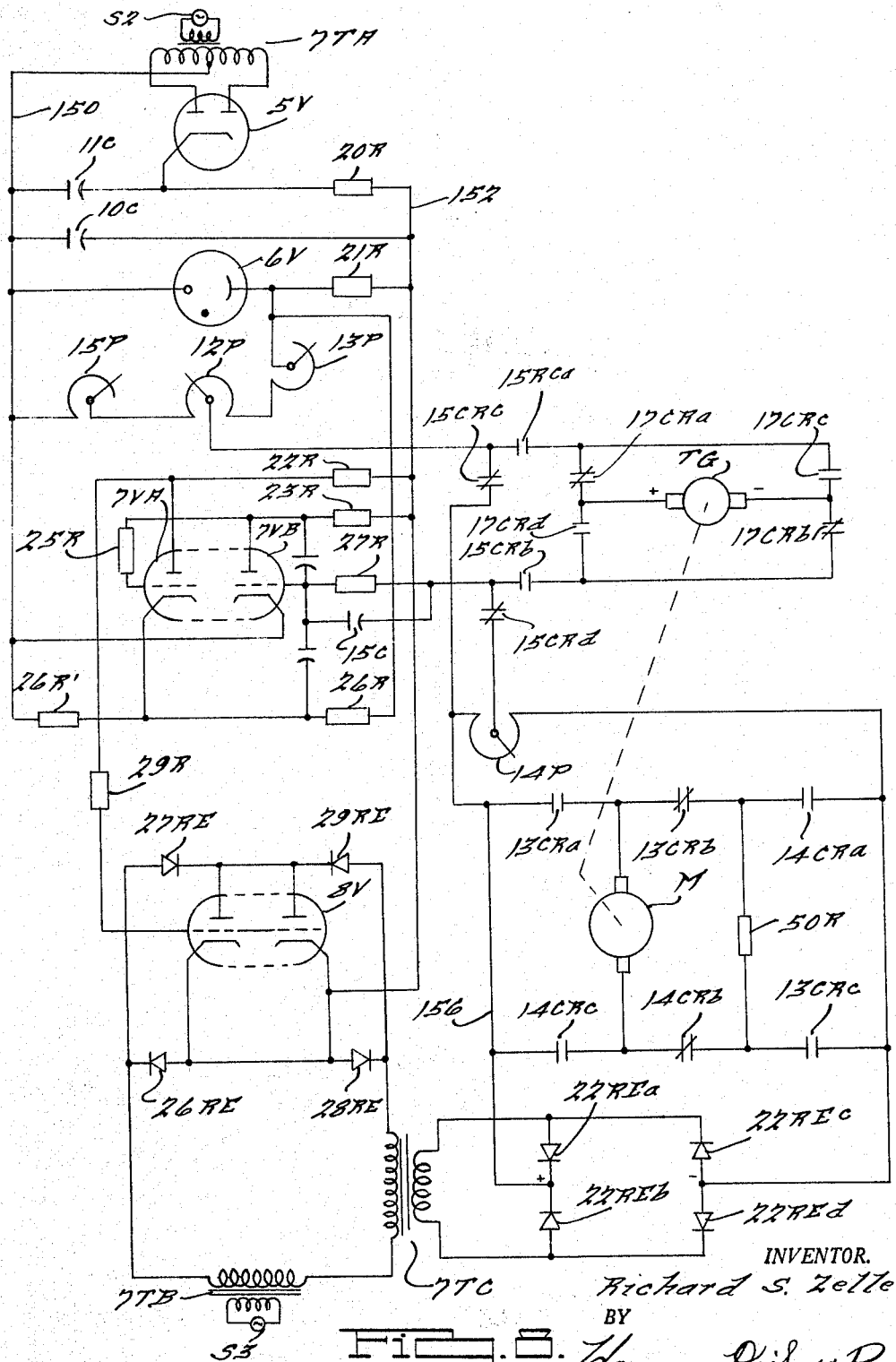

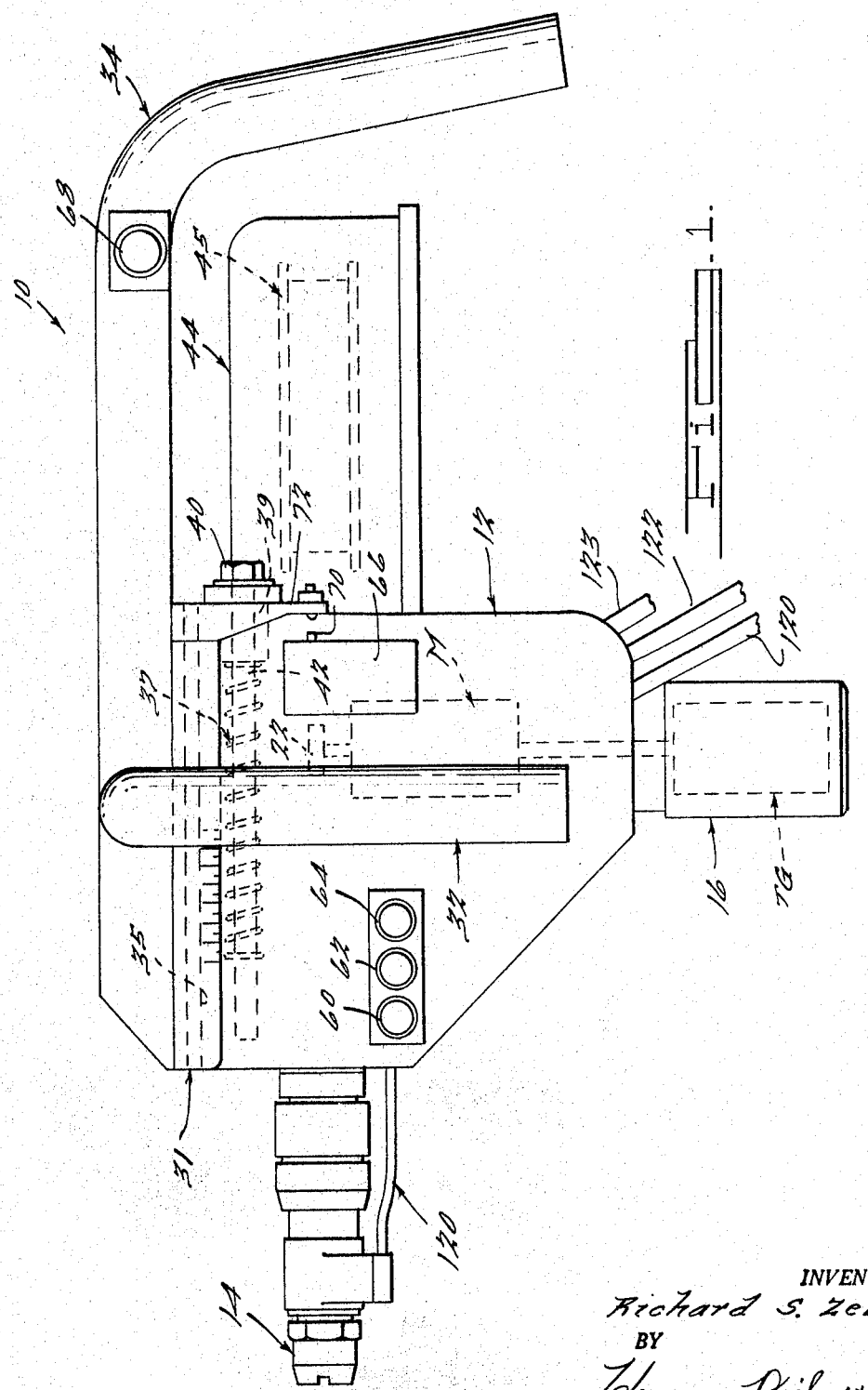

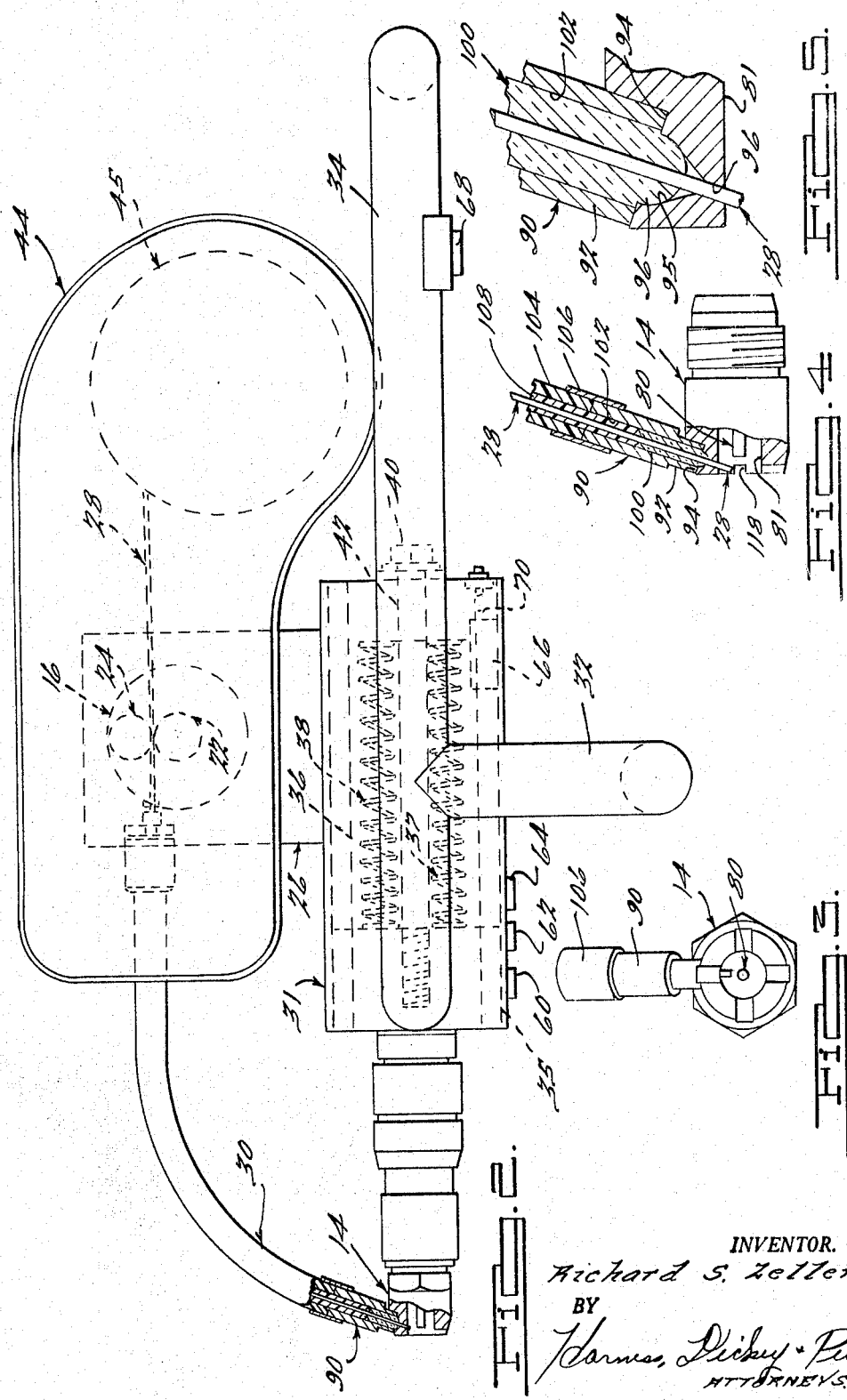

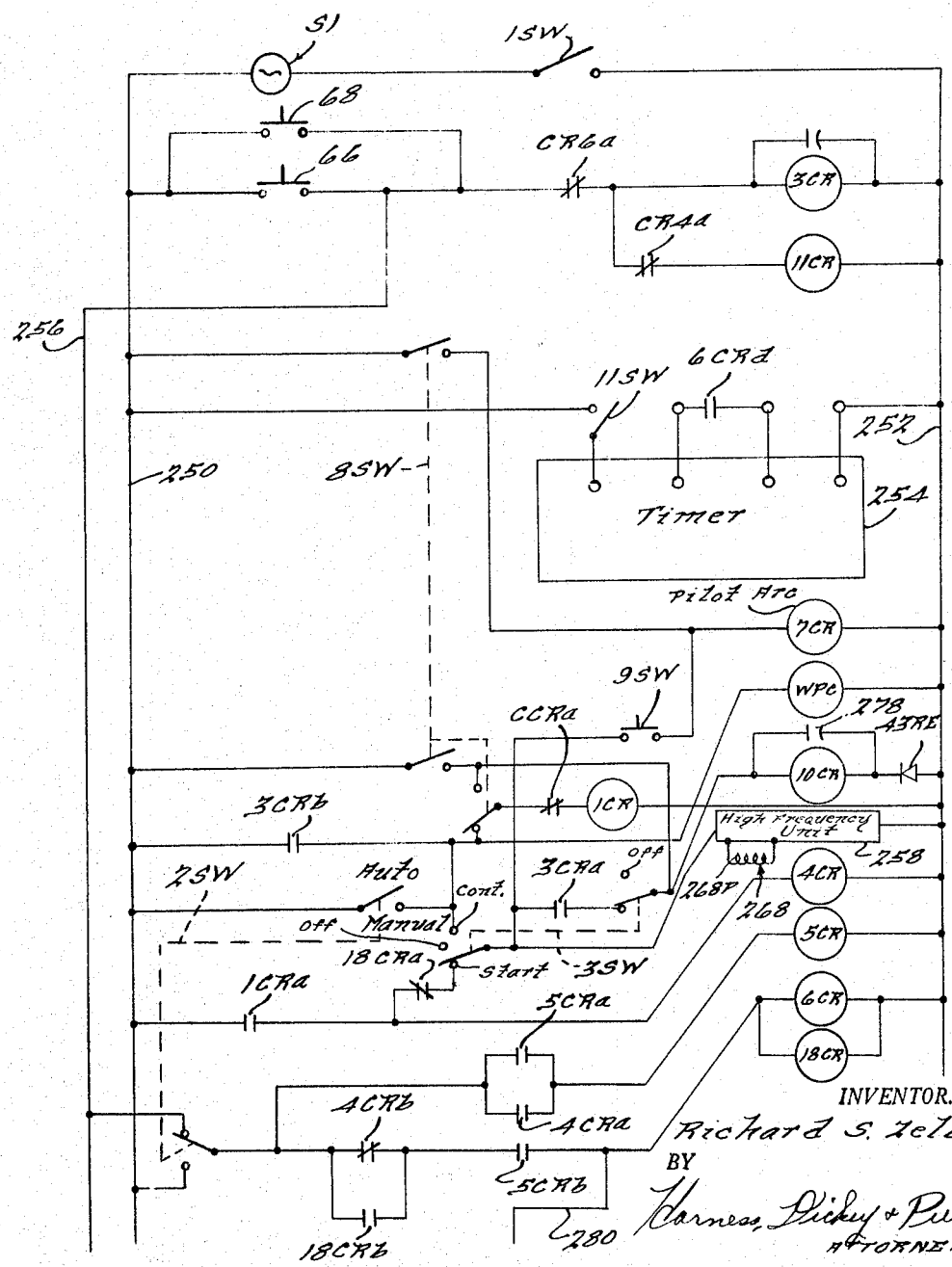

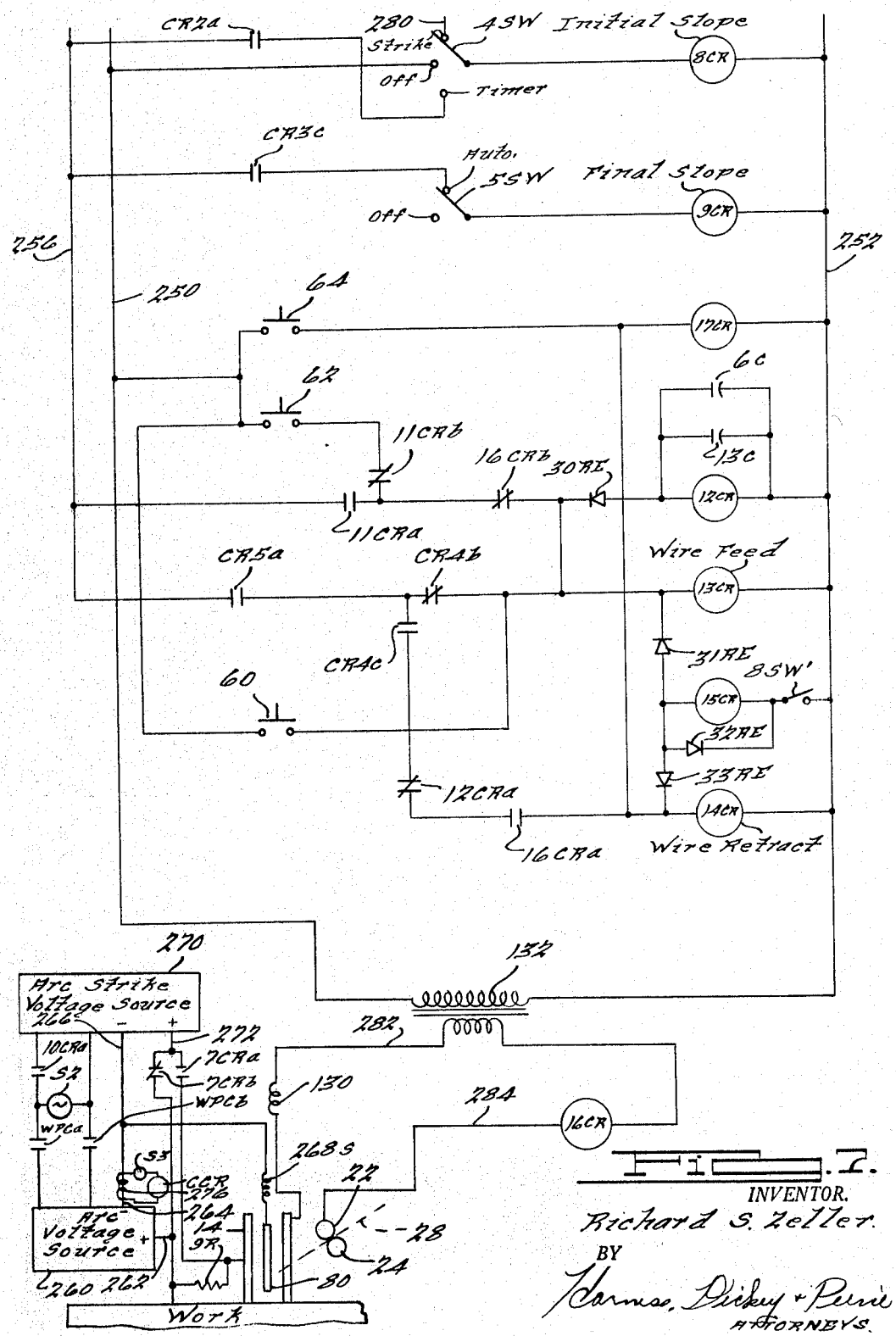

INVENTOR.
Richard S. Zeller
BY
Harness, Dickey & Pierce
ATTORNEYS.

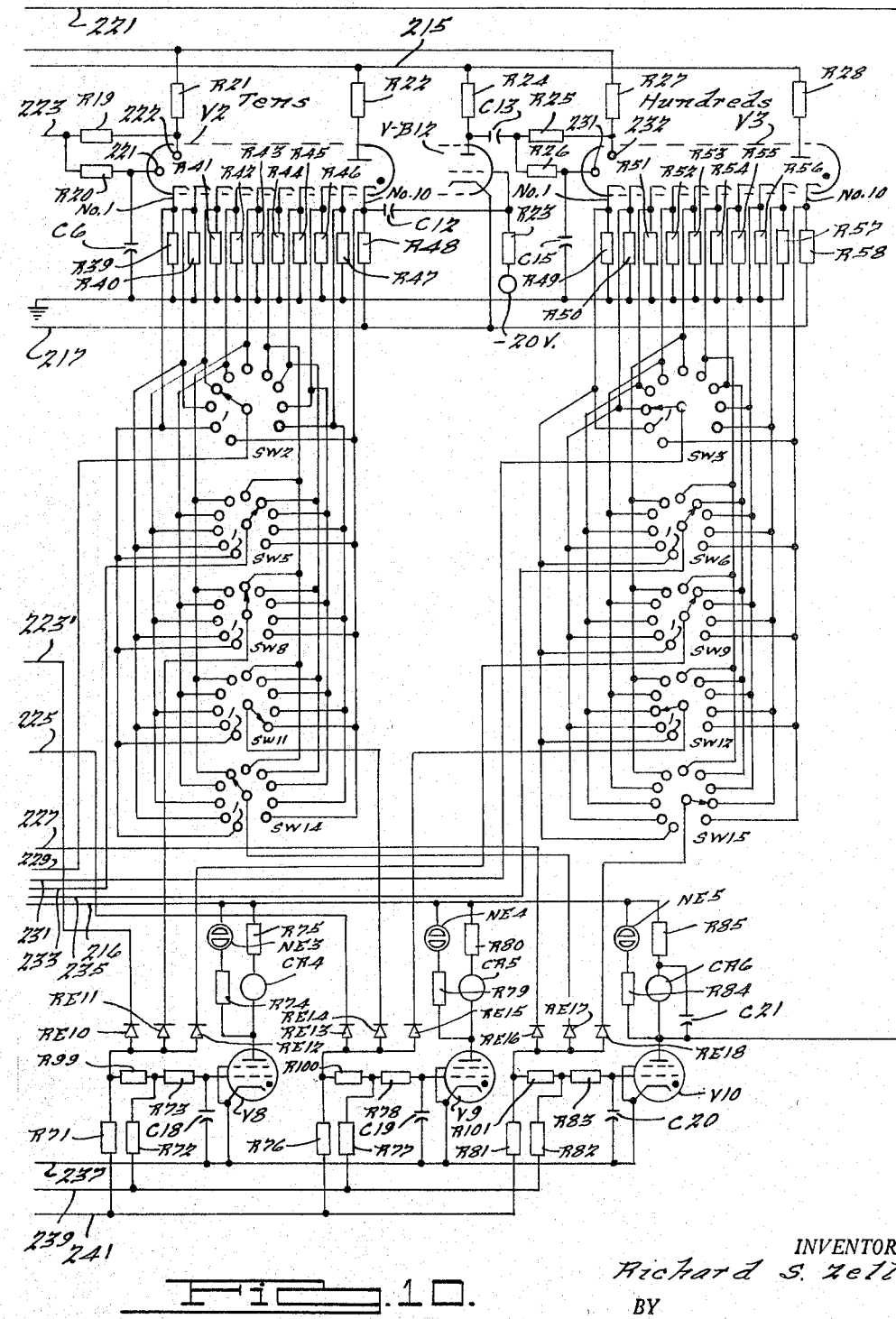

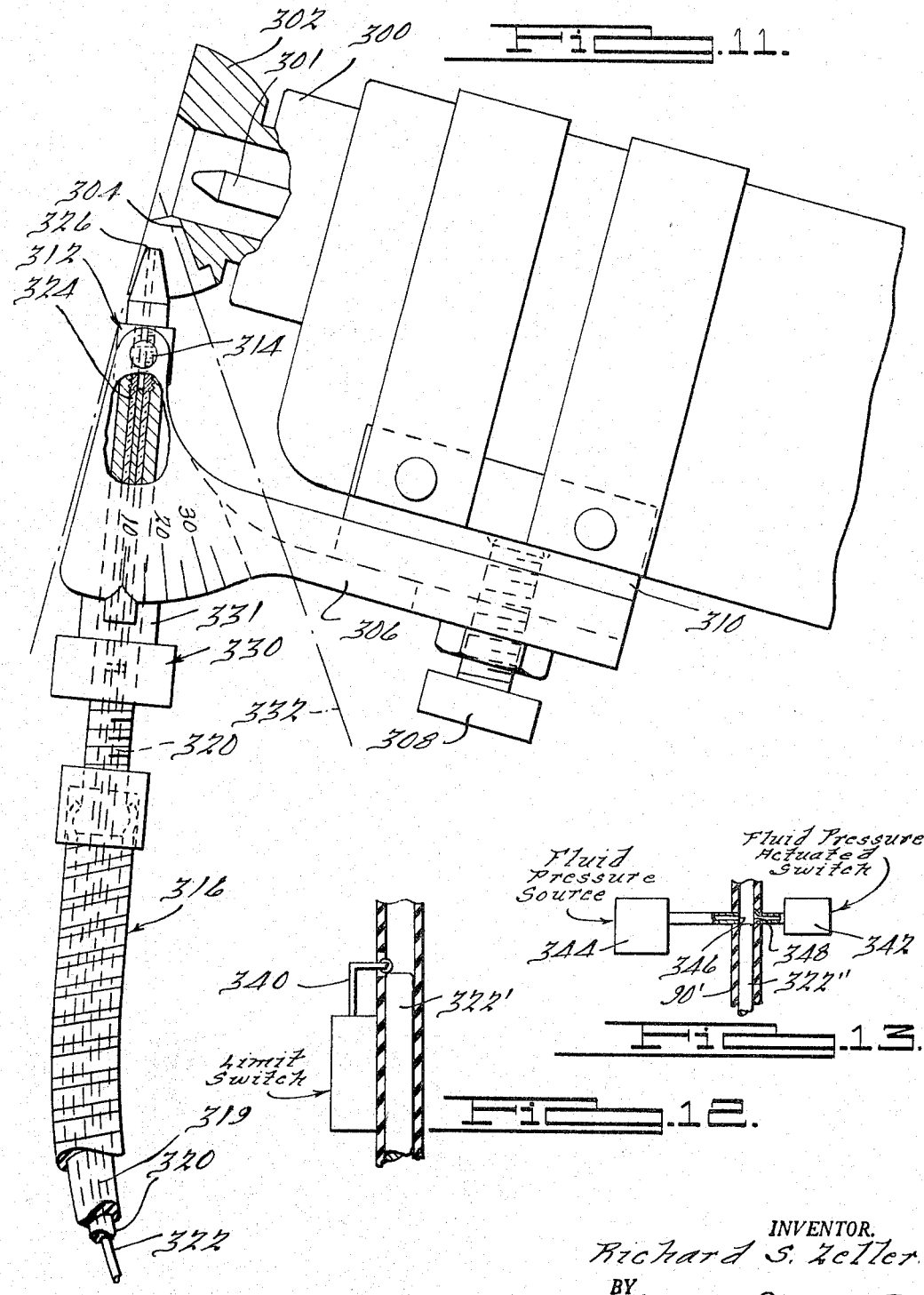

3,277,269
METHOD AND APPARATUS FOR ARC WELDING
Richard S. Zeller, Detroit, Mich., assignor to Weltronic Company, Southfield, Mich., a corporation of Michigan
Filed Feb. 10, 1964, Ser. No. 346,056
36 Claims. (Cl. 219—127)

This application is a continuation-in-part of my application Serial No. 29,329, filed May 16, 1960, now abandoned entitled Control Apparatus.

This invention relates to control apparatus and the principles of the invention are representatively embodied in an arc welding apparatus wherein a predetermined amount of filler wire is automatically fed into the fusion zone of the weld during each welding cycle.

An object of this invention is to improve the accuracy with which predetermined amounts of filler wire are fed into the weld puddle during arc spot welding.

Another object of the present invention is to improve the accuracy of the feed rate of a filler wire into the fusion zone of an arc spot welder.

Another object of this invention is to improve the accuracy of control over the amount of filler wire burn-off.

Another object of the present invention is to accurately locate the initial and final positions of the tip of the filler wire in an arc spot welding operation.

Another object of this invention is to improve the nozzle construction for arc welding guns to facilitate the feeding of filler wire into the weld puddle in a manner to improve the weld integrity.

Another object of this invention is to establish the location of the tip of the filler wire in an arc spot welding equipment.

Another object of this invention is to establish means for detecting the location of the tip of the filler wire in an arc spot welding equipment at a predetermined position.

Another object of this invention is to establish means for electrically isolating the filler wire from a metallic nozzle in an arc spot welding equipment except as a result of direct electrical engagement between the tip portion of the filler wire and the nozzle.

A further object of this invention is to insure that an arc welding operation will not be initiated until proper pressure has been established between the nozzle of the arc welding gun and the workpiece.

Another object of this invention is to insure that the duration of constituent operations during arc spot welding will be accurately measured.

Another object of this invention is to establish resetting of the means for timing the duration of the arc and duration of subordinate functions performed during the arc welding operation as a conditioned precedent to the restriking of a prematurely extinguished arc.

A further object of this invention is to improve the consistency of striking an arc in an arc spot welding operation.

Another object of this invention is to provide means for alternatively controlling the speed of a driving motor in accordance with the rotational speed of a tachometer generator or in accordance with the armature voltage of the motor.

Another feature of this invention is an improved means for preventing malfunctioning of the reversing mechanism associated with a reversible driving motor from short circuiting the power supply for the motor.

Figure 9:
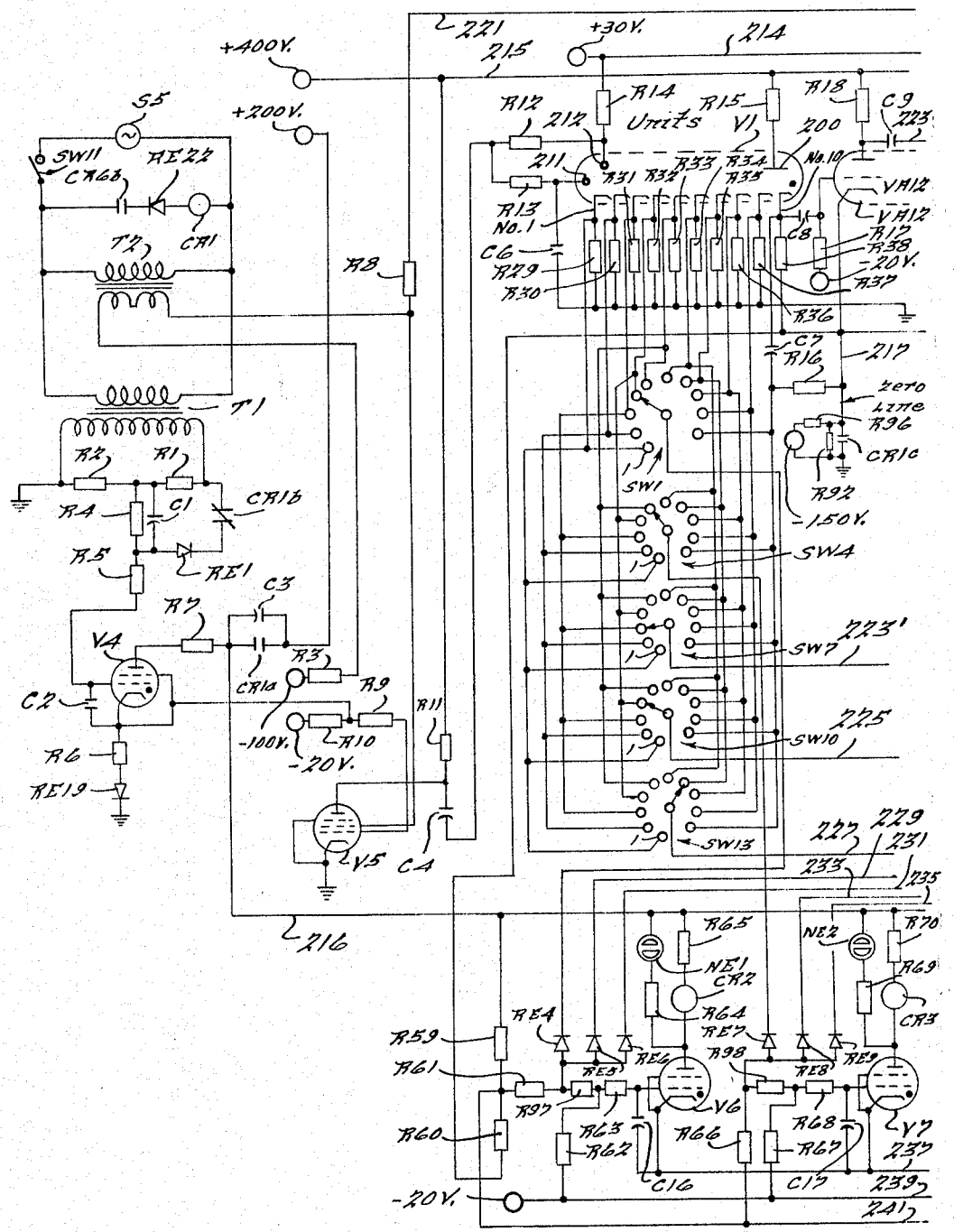

The manner of accomplishing the foregoing objects and other objects and features of this invention will become apparent from the following detailed description of an embodiment of the invention when read with reference to the accompanying drawings in which:

FIG. 1 is a side elevation of an arc welding gun in accordance with one embodiment of the present invention;
FIG. 2 is a top plan view of the welding gun of FIG. 1;
FIG. 3 is a front view of an arc welding gun nozzle constructed in accordance with the present invention;
FIG. 4 is a side view of the nozzle of FIG. 3, partially broken away for clarity;
FIG. 5 is an enlarged cross section view of a portion of the structure of FIG. 4;
FIG. 6 is a schematic representation of a portion of the control circuit for the welder;
FIG. 7 is a schematic representation of another portion of the control circuit for the welder;
FIG. 8 is a schematic representation of another portion of the control circuit including a motor speed control circuit for the wire feed motor;
FIG. 9 is a schematic representation of a portion of a timer suitable for use in cooperation with the circuits of FIGS. 6–8;
FIG. 10 is a schematic representation of another portion of the timer;
FIG. 11 is a fragmentary side elevation of a modified welding gun illustrating the nozzle and a portion of the wire feed mechanism;
FIG. 12 is a diagrammatic representation of a modified arrangement for sensing the position of the tip of the filler wire; and
FIG. 13 is a diagrammatic representation of another modified arrangement for sensing the position of the tip of the filler wire.

Referring to the drawings, certain of the principles of the present invention are embodied in an arc welding gun 10 comprising a housing 12 supporting a nozzle 14 which carries a wire guide 90. A wire drive mechanism 16 is supported on a bracket 26 secured to and extending transversely of the housing 12 and includes a reversible D.C. motor M coupled to a tachometer generator TG and to a drive roller 22 which cooperates with an idle roller 24. A suitable electrical circuit, to be described, effects control of the drive motor M to feed and retract a filler wire 28 between the drive and idle rollers 22 and 24 through a wire guide tubing 30 and guide 90 and the nozzle 14 into and from the fusion zone of the weld.

The housing 12 supports a slide 31 having a transversely and downwardly extending handle grip 32 and a rearwardly extending handle grip 34. The slide 31 is supported for movement forwardly and rearwardly of the housing 12 on suitable ways 35 and 36 and is normally biased rearwardly of the housing 12 as by a pair of helical compression springs 37 and 38. Rearward movement of the slide 31 is limited by engagement of a depending portion 39 thereof with an adjustment nut 40 threadably secured to an adjustment screw 42. The adjustment screw 42 is disposed between the helical compression springs 37 and 38 and secured to the housing 12. The slide 31 is movable forwardly of the housing 12 on the ways 35 and 36 thereby compressing the springs 37 and 38.

The drive mechanism support bracket 26 extends transversely of the housing 12 for the support of both the drive mechanism 16 and a wire spool enclosure 44. A suitable filler wire spool 45, supported for rotation within the enclosure 44 by any suitable means, feeds the wire 28 between the drive and idle rollers 22 and 24.

The housing 12 supports a filler wire advance override switch 60, a manual wire feed switch 62, a manual wire retract switch 64 and a sequence initiation switch 66. A second sequence initiation switch 68 is mounted on the handle 34 and electrically connected in parallel with the initiation switch 66.

The sequence initiation switch 66, which comprises a pair of normally open contacts, is supported upon the housing 12 in a position such that the contact actuating element 70 thereof is normally in spaced alignment with a downwardly depending bracket 72 on the slide 31. In use, the nozzle 14 is placed against the workpiece, and sufficient force is applied to the handles 32 and 34 to establish a firm engagement between the nozzle and the workpiece, and to compress the springs 37 and 38 to the point at which the bracket 72, carried by the slide 31, actuates the switch 66.

In accordance with one feature of the present invention, the nozzle 14 is of tubular construction for the acceptance of a nonconsumable electrode 80 of, for example, tungsten, supported within a central longitudinal bore 81 of the nozzle 14 in the conventional manner. Upon the striking of an arc between the electrode 80 and a workpiece, the workpiece is heated and the metal thereof puddled. The filler wire 28 is fed into the weld puddle.

The axially rearwardly and radially outwardly extending tubular filler wire guide 90 has a lower end portion 92 secured in a complementary counterbore 94 in the nozzle 14. A bore 96 extends into the central aperture 81 of the nozzle 14 for the guidance of the filler wire 28 thereinto. The counterbore 94 has an annular arcuate seat 95 for the seating of an end portion 96 of a tubular insulating sleeve 100. The sleeve 100 is accommodated in a central bore 102 of the guide 90. An outer tubular member 104 is of insulating plastic material (for example, Tygon) and is secured to the guide 90 as by a collar 106 and has an insulating tube 108 of, for example, nylon, disposed interiorly thereof for the support of the wire 28. The inner tube 108 extends into the bore 102 of the guide 90 and biases the inner end 96 of the sleeve 100 against its seat 95 in the nozzle 14. The filler rod 28 is driven by the drive mechanism 16 through the aforementioned terminal structure into the central cavity or bore 81 of the nozzle 14 where is is melted in the arc drawn between the electrode 80 and a workpiece.

The angular disposition of the guide 90 with respect to the nozzle 14 is such as to feed the wire 28 into the weld puddle at the optimum angle of entry which has been determined to be approximately 20 degrees with respect to the plane of the workpiece or, if the workpiece is curved, from a tangent drawn through the arcing point on the workpiece. As is best shown in FIG. 4 of the drawings in the preferred practice, the tip of the filler wire W intersects the plane of the front or end face of the nozzle 14 substantially in line with the edge of the electrode 80.

The aforementioned construction of the nozzle 14 serves another function in accordance with a feature of the present invention in that the filler wire 28 completes an electrical circuit with the metallic nozzle 14 upon the entrance thereof into the bore 96, thereby the control the welding sequence, as will be described. Because the sleeve 100 is an insulating member, electrical continuity between the filler wire 28 and the nozzle 14 is broken upon retraction of the wire 28 upwardly into the sleeve 100. This interruption of electrical continuity between the filler wire 28 and nozzle 14 has a distinct electrical function in the control circuitry of the welder, as will be described.

Suitable conduits 120, 122, and 123 are provided for the conduction of inert gases, for example, argon and helium, and of cooling water to the nozzle 14 in the conventional manner, the flow of inert gas being facilitated by gas relief cutouts 118 in the nozzle 14.

The disclosed circuits include a motor control circuit depicted in FIG. 8 of the drawings which controls the wire-feed motor, a control circuit depicted in FIGS. 6 and 7 of the drawings which controls a number of elements of the system including the motor control circuit of FIG. 8, and a timer depicted in FIGS. 9 and 10 which controls portions of the circuit of FIGS. 6 and 7. The circuits of FIGS. 6 and 7 will be described under the assumption that the contactor switch 2SW is in its illustrated "automatic" rather than "manual" position, in which switch 3SW is in its "start" position, as illustrated, rather than in its neutral "off" position or in its upper "continuous operation" position, in which timer switch 11SW is closed, in which the initial-slope switch 4SW (FIG. 7) is in its illustrated "strike" position rather than in its intermediate "off" position or in its lower "timer" position, in which the final slope switch 5SW is in its illustrated "automatic" position rather than in an "off" position and in which switch 8SW is closed. It will further be assumed that the jogging switches 62 and 64 are not actuated. The operation of the circuit with any of the switches in other positions will be apparent after and from the following description.

The circuits of FIGS. 6 and 7 are energized from a source S1 upon the closure of switch 1SW, establishing an energizing voltage difference between conductors 250 and 252. However, no operational action occurs until switch 66 or 68 is closed. It will be recalled from the description of FIGS. 1 and 2 that switch 68 is manually actuated and that switch 66 is actuated in response to the nozzle 14 being pressed with sufficient force against the workpiece.

The closure of switch 66 or 68 connects conductor 250 to conductor 256 thereby establishing an alternating voltage between conductors 256 and 252. The closure of switch 66 or 68 also completes a circuit from conductor 250 through normally closed contacts CR6a and through the winding of relay 3CR to conductor 252 as well as through normally closed contacts CR4a and through the winding of relay 11CR to conductor 252. Contacts CR6a and CR4a are contacts of the "spot time" relay CR6 and of the "wire stop delay" relay CR4 in the timer 254, as illustrated in detail in FIGS. 9 and 10, respectively, of the drawings.

The operation of relay 3CR (FIG. 6) results in the closure of contacts 3CRb thereof which completes a circuit from conductor 250 through the closed contact of switch 8SW through the normally and now-closed contacts CCRa of an arc current relay to be described, and through the winding of relay 1CR to conductor 252, thereby operating relay 1CR. The closure of contacts 3CRb also completes an energizing circuit for the welding contactor WPC.

The operation of relay 1CR results in the closure of the contacts 1CRa thereof to complete a circuit from conductor 250 through normally and now-closed contacts 18CRa, through the closed contacts of switch 3SW, through switch 9SW (assuming that switch to be closed) and through the winding of relay 7CR to conductor 252, thereby operating relay 7CR. The closure of contacts 1CRa also completes an energizing circuit for relay 4CR to operate that relay and the resultant closure of contacts 4CRa thereof completes a circuit from conductor 256, closed contacts of switch 2SW, contacts 4CRa, and through the winding of relay 5CR to conductor 252 to operate relay 5CR. Relay 5CR, in operating, closes its contacts 5CRa to complete a latching or locking circuit for itself so that it will remain operated even though relay 4CR later releases as long as switch 66 or 68 remains closed. It will be noted that although relay 5CR, in operating, closes its contacts 5CRb, the fact that relay 4CR is now operated and relay 18CR is now released prevents an energizing circuit from being completed for relays 6CR and 18CR at this time.

The aforesaid closure of contacts 1CRa also completes a circuit through normally and now-closed contacts 18CRa, the closed contacts of switch 3SW, contacts 3CRa, the closed contacts of switch 3SW, and through the winding of relay 10CR and unidirectional current conducting device 43RE to conductor 252 as well as through the "high-frequency unit" 258 to conductor 252. It will therefore be seen that as a result of the operation of relay 3CR and the resultant operation of relay 1CR, contactor WPC, relay 7CR, relay 10CR and the "high frequency unit" 258 are all energized.

The operation of the contactor WPC results in the closure of its contacts WPCa and WPCb (FIG. 7) to connect the source S2 to arc voltage source 260, and sustaining voltage derived from the source 260 is applied between the electrode 80, at a negative potential, and the work.

The closure of contacts 10CRa resulting from the operation of relay 10CR completes the connection of the source S2 to the arc strike voltage source 270, thereby energizing that source 270. Source 270 is a conventional direct voltage source adapted to rectify the alternating voltage applied thereto from the source S2, to filter the rectified voltage, and to develop an output direct voltage between conductors 266 and 272 the latter being positive relative to the former. This voltage is of considerably higher amplitude than the voltage from source 260 and serves as an arc strike booster voltage during high frequency start. In the preferred practice, source 270 develops a direct voltage in the order of 130 to 150 volts between conductors 266 and 272. The conductor 266 is connected to the electrode 80 through the transformer secondary winding 268S and the voltage appearing on conductor 272 is applied through the now-closed contacts 7CRb to the work.

The high-frequency unit 258 (FIG. 6) comprises a generator of high-frequency signals serving as an ionizing voltage. The frequency of these signals is not critical and in a constructed arrangement, an arc-gap discharge oscillator was employed so that the high-frequency unit developed a variety of high-frequency signals. The high-frequency unit 258 is energized, as above discussed, by the application of the voltage between conductors 250 and 252 thereto and develops the output high-frequency signal across the primary winding 268P of a transformer 268, the secondary winding 268S (FIG. 7) of which is, as previously discussed, connected in series with the electrode 80. Since the high-frequency unit 258 and relay 10CR are operated at the same time, both the arc strike booster voltage source 270 and the radio-frequency voltage to facilitate initial ionization of the gap are concurrently applied. Conditions are thereby established for initiating an arc.

When the arc strikes so that current is flowing from the arc voltage source 260, the arc strike booster voltage source 270 and the source of high frequency ionization are deenergized. This is accomplished by associating a saturable core reactor, having a winding 276, with the lead 264. Winding 276 is connected in series with an alternating current source S3 and the winding of a relay CCR. In the absence of current through conductor 264, winding 276 offers a sufficient impedance to alternating current flow to prevent energization of relay CCR. However, the flow of the arc current through the conductor 264 will produce saturation of the core associated with winding 276 to reduce the effective impedance of that winding and to permit relay CCR to operate.

When relay CCR operates, it opens its contacts CCRa (FIG. 6) to release relay 1CR. Relay 1CR, in releasing, opens its contacts 1CRa to release relay 7CR and deenergize relay 10CR as well as to disconnect the high-frequency unit 258 from its source of energizing alternating current. In this manner, the application of the high-frequency voltage is terminated and the arc strike booster voltage source 270 (FIG. 7) is disconnected from the nozzle 14. The source 270 is deenergized shortly thereafter upon the opening of contacts 10CRa, relay 10CR being slow-to-release by virtue of the provision of the rectifier 43RE connected in series with that winding and of a capacitor 278 connected in parallel therewith.

The release of relay 1CR and the resultant opening of contacts 1CRa also deenergizes relay 4CR. The resultant opening of contacts 4CRa does not change the state of relay 5CR since the contacts 5CRa of that relay are closed in shunt of contacts 4CRa. The closure of contacts 4CRb, now that contacts 5CRb are closed, completes energizing circuits for relays 6CR and 18CR as well as an energizing circuit via conductor 280 and through the closed contacts of switch 4SW for relay 8CR.

Relay 18CR, in operating, closes its contacts 18CRb to complete a locking circuit for relays 6CR and 18CR in shunt of contact 4CRb. Relay 6CR, in operating, closes its contacts 6CRa which serves to initiate the timing operation of the timer 254. This timer operates in a manner to be described to control the state and change of state of a number of the contacts in FIGS. 6 and 7 of the drawings.

It will be observed that normally closed contacts 18CRa of relay 18CR are included in the energizing circuits of relay 10CR and of the high frequency unit 258. If it were not for this inclusion, mis-timing could occur. Thus, if the arc has been struck so that relay 1CR is released and relay 6CR is operated to initiate timing, if thereafter the arc becomes extinguished, and if it were possible thereafter to restrike the arc, the actual arc time would be improperly short. However, with the disclosed circuitry, once relays 6CR and 18CR have operated to initiate timing, the resultant opening of contacts 18CRa prevents re-operation of relay 10CR and of the high frequency unit 258 which would otherwise occur in response to the releasing of relay CCR (when the arc extinguishes) and the resultant reoperation of relay 1CR. To restrike the arc, the operator must release whichever of the switches 66 and 68 was closed, and then reclose that switch. By this procedure, relay 6CR is released and, the timer 254 is reset and the entire cycle is re-initiated, thereby insuring that the timer is reset to "zero" each time that the arc is struck.

As was above noted, relay 8CR (FIG. 7) was operated in response to the operation of relay 5CR and the subsequent release of relay 4CR. Relay 8CR controls the voltage source 260 and is an "initial slope" controlling relay. The circuits of the arc voltage source 260, including initial slope features, controlled by relay 8CR, and final slope control features, controlled by relay 9CR, are conventional.

It will be recalled that in initial response to the closure of switch 66 or 68 (FIG. 6) relay 11CR operated. Relay 11CR, in operating, opens its contacts 11CRa (FIG. 7) to disable the forward or feed manual control switch 62 (used for jogging purposes) and closes its contacts 11CRa to complete a circuit from conductor 256 through now closed contact 16CRb, rectifier 30RE and to the winding of relay 12CR to conductor 252. The winding of relay 12CR is shunted by capacitors 6C and 13C to render it slow-to-release for a purpose hereinafter to be noted. Relay 12CR, in operating, opens its contacts 12CRa to disable one energizing circuit for relay 14CR.

The closure of contacts 11CRa also completes a circuit from conductor 256 through contact 16CRb and through the winding of relay 13CR to conductor 252 as well as through rectifier 31RE and the winding of relay 15CR to conductor 252. As a result, both relays 13CR and 15CR are operated. These relays have contacts in the motor control circuit of FIG. 8 and serve to cause the motor M to advance the wire 28 (FIG. 2) through the guide structure 90. This advance of the filler wire 28 continues until the wire makes electrical engagement with the metal of the nozzle at the bore 96 (FIG. 5). When this occurs, a circuit is completed from the voltage at the secondary winding of transformer 132 (FIG. 7), conductor 282, inductor 130, nozzle 14, wire 28, roller 22, wire 284, winding of relay 16CR, and back to the secondary winding of transformer 132. Thus, the engagement of the wire 28 with the metallic nozzle 14 completes an energizing circuit for relay 16CR.

Relay 16CR, in operating, opens its contacts 16CRb to interrupt the energizing circuits for relays 13CR and 15CR, thereby terminating the feed or advance of the wire. The opening of contacts 16CRb also terminates the energization of relay 12CR which, as above noted, is slow-to-release. At the end of the release period of relay 12CR, contacts 12CRa close. While contacts 16CRa are also closed at this time, contacts CR4c are open so that no energizing circuit is completed for the retract relay 14CR. The wire then remains in this position, just engaging the metal of nozzle 14.

The welder remains in this condition, with the arc struck, until the occurrence of the first timing event produced by the timer 254. Timer 254, as will be discussed further hereinafter, can time five separate intervals, all of which are initiated by the closure of contact 6CRa (FIG. 6) and each of which can be set to any duration independent of the duration of any of the other timing intervals.

In the illustrative arrangement disclosed in FIGS. 6 and 7, five timing functions are or may be performed: The initial slope delay, that is, the time at which relay 8CR (FIG. 7) is operated to control the up-slope or initial slope period of the arc voltage source 260 (which in the illustrated setting of switch 4SW is not employed); the wire start delay period which is the delay between the initiation of timing and the time at which the wire is advanced into the puddle; the wire stop delay period which is in the interval between energization of the timer and the time at which the wire feed is terminated by releasing relays 13CR and 15CR (FIG. 7); the final slope delay period which is the interval between the energization of the timer and the actuation of relay 9CR (FIG. 7) to cause the arc voltage source 260 to initiate the final slope current characteristic; and the spot time period at which the welding cycle is terminated. As will be seen, the timer 254 (FIG. 6) includes five relays designated CR2 through CR6 and for purposes of illustration, relay CR2 has been assigned the initial slope delay function (not here performed) so that its contacts CR2a (FIG. 7) are connectable to control the energization of relay 8CR; relay CR3 in the timer has been assigned the final slope delay function and hence its contacts CR3c (FIG. 7) control the energization of the final slope relay 9CR; relay CR4 in the timer has been assigned the wire stop delay function and hence its contacts are utilized to control the wire feed and wire retract relays 13CR and 14CR; relay CR5 in the timer has been assigned the function of controlling the wire start delay period and hence its contacts CR5a are also connected in energizing circuits for the wire feed and wire retract relays 13CR and 14CR; and relay CR6 in the timer has been assigned the over-all or spot time function and hence its contacts CR6a are connected in the initiation circuit and control relays 3CR and 11CR, the latter of which is also controlled by contacts of the wire stop delay relay CR4.

The first effective one of the timing events to occur, in the representative sequence, is the actuation of the wire start delay relay CR5 in the timing circuit. The resultant closure of contacts CR5a (FIG. 7) completes a circuit from conductor 256 through now-closed contact CR4b to complete energizing circuits for relays 12CR, 13CR and 15CR. As will be described in connection with the motor control circuits of FIG. 8, this results in an advance of the wire into the weld puddle. It will be observed that the wire 28 remains in electrical engagement with the nozzle 14 during this advance so that relay 16CR remains operated. The rate of advance of the wire is carefully selected and accurately controlled so that by controlling the duration of the feed the amount of wire fed into the puddle can be accurately predetermined and preselected.

The wire continues to be fed into the puddle until the wire stop delay relay CR4 in the timing circuit operates. The resultant opening of contacts CR4a (FIG. 6) releases relay 11CR to open contacts 11CRa (FIG. 7) and close contacts 11CRb with no present effect. The resultant opening of contacts CR4b (FIG. 7) terminates the energization of relays 12CR, 13CR and 15CR. The release of relays 13CR and 15CR terminates the forward or advancing operation of the motor M to terminate the feeding of the wire into the puddle. The closure of contacts CR4c prepares an energizing circuit for relays 14CR and 15CR. However, this circuit is not complete until the slow-to-release relay 13CR has released. When this occurs and the contacts 12CRa close, a circuit is completed from conductor 256, contacts CR5a, contacts CR4c, contacts 12CRa, contacts 16CRa, and through the winding of relay 14CR to conductor 252 as well as through rectifier 33RE and the winding of relay 15CR to conductor 252. The operation of relays 15CR and 14CR energizes the motor M to retract the wire from the puddle. The purpose of connecting the contacts 12CRa in this circuit is to insure an adequate time delay during which the motor can come fully to a halt. This is not imperative in all circuits, of course, but is here provided since in the preferred arrangement a permanent magnet motor is employed which could become damaged if reverse currents were applied when the motor is still rotating in the forward direction.

The wire continues to be withdrawn from the puddle until it is retracted from engagement with the nozzle 14, that is, until is drawn out of the bore 96 (FIG. 5) of the nozzle 14. When this occurs, the previously described continuity circuit is interrupted and relay 16CR releases to open its contacts 16CRa to release relays 14CR and 15CR to terminate the retracting operation of the motor. It will be appreciated that this establishes with consistent accuracy a final position of the wire tip which can be effectively identical to the aforesaid accurate initial position as detected by the same tip-position sensing means. If there is a slight overrun on retract due to inertia, the wire will be advanced to the selected initial position preliminary to the next wire-feed operation as above described. It is feasible under some circumstances to utilize the retracted position of the wire as the accurate initial position, that is, the act of accurately locating the "initial" position of the wire can be accomplished at the end of an operation, on retract, without providing means to set or reset that position at the beginning of the next weld and wire-feed operation, although the illustrated arrangement is preferred. Conversely, an important function of retracting the filler wire is, as above noted, to remove the wire from the weld area following its feed-end so as to reduce the amount of burn-off, after wire feed has stopped and so as to insure that whatever burn-off does occur is consistent from operation to operation so that the system can be calibrated to give accurate, selectable, consistent wire feed. From that standpoint, it is not imperative that the wire be retracted to the selected initial position or for the matter even to an accurate retracted position as long as means are provided, as disclosed, for moving the tip of the filler wire to a selected initial position prior to the next wire-feed operation. Hence, it is not imperative that the retracted position of the filler wire be sensed or effectively sensed at the end of an operation, the retraction of the filler wire merely continuing, for example, for a period of time, as, for example, by the use of a time delay relay or the like instead of the sensing means, to terimnate wire retraction. The amount of retraction, however, should be sufficient to withdraw the wire beyond the burn-off zone, although if the wire is not retracted to the initial position sensing point, the movement of the wire to the selected initial position, preliminary to the next subsequent weld operation, would be in a retracting sense.

Thereafter, in the respresentative sequence, the final slope delay relay CR3 in the timer operates to operate the final slope relay 9CR (FIG. 7) to control the final or current period. Thereafter, the spot time relay CR6 in the timer circuit operates to open its contacts CR6a (FIG. 6) to release relay 3CR. Relay 3CR, in releasing, opens its contacts 3CRb to release the welding contactor WPC to terminate welding current, and produces the release of the other relays to restore the circuits to normal in prepaartion for the next cycle of operation.

The foregoing description pertains to the assumed high-frequency starting conditions.

The functioning of the equipment when the pilot arc mode of operation is utilized is identical to that above described except as expressly noted hereinafter.

In pilot arc operation, prior to the closing of switch 66 or 68, switch 8SW is operated so that each of its ganged elements is switched from its illustrated position to the opposite position and switch 3SW is turned to its "off" position. As a result, a circuit is completed from conductor 250 to the upper illustrated contact of switch 8SW and through the winding of the pilot arc relay 7CR to conductor 252 to operate that relay. The closure of the intermediate set of contacts of switch 8SW completes an energizing circuit for relay 10CR. The change of position of the lower illustrated contacts of switch 8SW, coupled with the closure of the intermediate set of contacts, completes an energizing circuit through contacts CCRa to operate relay 1CR.

The operation of relay 10CR results in the closure of contacts 10CRa (FIG. 7) to energize the source 270 of pilot arc voltage. The operation of relay 7CR opens contacts 7CRb (FIG. 7) to disconnect output conductor 272 from the work, and the operation of that relay results in the closure of contacts 7CRa to connect the output conductor 272 to the nozzle 14. This establishes a pilot arc sustaining voltage between the electrode 80 and the nozzle 14. To assist in starting the pilot arc, switch 9SW (FIG. 6) may be momentarily actuated to complete a circuit from conductor 250, through the upper set of contacts of switch 8SW, and through switch 9SW to the high-frequency unit 258. As soon as the pilot arc starts, switch 9SW is released.

The above noted operation of relay 1CR results in the closure of contacts 1CRa to complete an energizing circuit for relay 4CR. When the nozzle is placed against the work, the pilot arc transfers so as to exist between the electrode and the work. Due to current limiting features in the power supply 270 this is a low-current arc of the order of, for example, 5 amperes. When switch 66 or 68 operates, relays 3CR and 11CR operate. The operation of relay 11CR initiates the wire-feed operation to preselect the position of the wire tip, as above described, and the operation of relay 3CR produces closure of its contacts 3CRb to actuate the contactor WPC to energize the arc voltage source 260 (FIG. 7).

In the meantime, the operation of switch 66 or 68 has completed a circuit through the now-closed contacts 4CRa to operate relay 5CR.

When the arc voltage source 260 becomes effective to produce the full arc, relay CCR (FIG. 7) operates to open its contacts CCRa (FIG. 6) to release relay 1CR which releases relay 4CR. The resultant closure of contacts 4CRb completes an energizing circuit for relays 6CR and 18CR to initiate the operation of the timer 254, as above described.

In the motor control circuit of FIG. 8, the alternating voltage induced across the secondary winding of transformer 7TA is full-wave rectified by means including rectifier 5V and is filtered by the network including capacitors 10C and 11C and resistor 20R to develop a direct voltage between conductors 150 and 152, the former of which is at a negative potential relative to the latter. This direct voltage is applied across serially interconnected resistor 21R and voltage regulating gas diodes 6V. The voltage appearing across the voltage regulator 6V is applied across a series circuit comprising variable resistor 13P, the resistive element of potentiometer 12P, and variable resistor 15P. The direct voltage appearing between the movable element of potentiometer 12P and conductor 150 is employed as a reference voltage to control the speed of the motor M in a manner to be described, and adjustable resistors 13P and 15P are utilized to adjust the maximum and minimum selectable speeds of the motor, respectively.

As noted from the prior description of the circuits of FIGS. 6 and 7, during either foward or reverse operation of the motor M, relay 15CR is operated, relay 17CR is released during the forward or feeding energization of motor M but is operated during the retract operation of the motor, relay 13CR is actuated to feed the wire, and relay 14CR is actuated in lieu of relay 13CR to produce a retraction of the wire.

With relays 13CR and 15CR operated and relays 14CR and 17CR released to energize the motor M to feed or advance the wire, a circuit is completed from the movable element of the potentiometer 12P, contacts 15CRa, normally closed contacts 17CRa, through the tachometer generator TG, normally closed contacts 17CRb, contacts 15CRb, resistor 27R (shunted by capacitor 15C) and to the control grid of triode 7VB. The cathode of tube 7VB is connected to conductor 150 and the anode of that tube is connected through load resistor 23R to conductor 152. When the tachometer generator is geing driven as a result of the energization of the motor M to feed the wire, it will develop a direct voltage such that its left hand terminal is positive relative to its right hand terminal, so that its output direct voltage is applied in opposition to or buckling relation with the positive reference potential.

If tachometer generator TG is being driven too slowly, a signal deviating from the preselected value in a positive direction is applied to the control grid of tube 7VB. The resulting drop in the plate potential of tube 7VB is directly coupled to the control grid of triode 7VA through resistor 25R. The anode of vacuum tube 7VA is connected to the positive potential on conductor 152 through load resistor 22R, while the cathode of that tube is at a positive potential established at the junction of resistors 26R' and 26R which are connected in series between conductors 150 and 152. In a constructed embodiment, resistor 26R' was about ten times the size of resistor 26R so that the cathode of tube 7VA was at a fairly high positive value.

The reduction of the voltage of the control grid of tube 7VA reduces the conductivity of that tube and produces an increase in the voltage at the anode thereof due to the voltage drop across load resistor 23R. This voltage is applied through resistor 29R to the control grids of dual-triode 8V, the two sections of which are connected in parallel.

The cathodes of tube 8V are connected to conductor 152 to provide, in conjunction with the positive potential applied to the grids of tube 8V from tube 7VA, a negative bias. The anode circuit of tube 8V is energized from an alternating current source S3 (which may be the same source as those disclosed elsewhere in this application) via a transformer 7TB. The anodes of tube 8V are connected through rectifier 27RE to one terminal of the secondary winding of transformer 7TB and are also connected through rectifier 29RE and the primary winding of transformer 7TC to the other terminal of the secondary winding of transformer 7TB. The cathodes of tube 8V are connected to the left hand terminal of the secondary winding of transformer 7TB by means of a rectifier 26RE, and are connected to the upper terminal of the primary winding transformer 7TC via rectifier 28RE.

Tube 8V serves in effect as a variable resistance element to control the magnitude of the alternating current in the primary winding of transformer 7TC. When the left hand terminal of the secondary winding of transformer 7TB is positive, current flows through rectifier 27RE, through both sections of dual-triode 8V, through rectifier 28RE, and through the primary winding of transformer 7TC back to the secondary winding of transformer 7TB. When the right hand terminal of the secondary winding of transformer 7TB is positive, current flows through the primary winding of transformer 7TC, rectifier 29RE, through the paralleled sections of tube 8V, rectifier 26RE, and back to the secondary winding of transformer 7TB. The magnitude of this current flow will be determined by the potential at the control grid of tube 8V. Under the assumed conditions, the potential at the control grids of the sections of tube 8V will be higher than normal (in a positive sense) producing a relatively large current flow through the secondary winding of transformer 7TC.

The alternating current through the secondary winding of transformer 7TC is rectified by the full-wave bridge comprising rectifiers 22REa, 22REb, 22REc, and 22REd. The resultant positive potential appearing at conductor 156 is applied (under the assumption that relay 13CR is operated and relay 14CR is released, as above noted) through contacts 13CRa, the winding of motor M, and through contacts 14CRb and 13CRc to the negative potential appearing at the junction of rectifiers 22REc and 22REd. With generator TG running too slowly, the potential is relatively high, the magnitude of the current flow in this path will be large and motor M will be rotated at a higher speed. This will result in an increase in the output voltage of tachometer generator TG, producing a reduction in the potential at the control grid of vacuum tube section 7VB, an increase in the current flow through section 7VA, a reduction in the voltage at the control grids of dual-triode 8V, a corresponding decrease in the conductivity of that tube, a consequent reduction in the current through the primary and secondary windings of transformer 7TC, and a corresponding reduction of the energizing voltage for motor M, tending to reduce its speed. In this fashion, the speed of motor M is closely regulated to a preselected value.

In the event that relay 13CR is released and relay 14CR is operated to produce retracting movement of the motor M, it is necessary to reverse the polarity of tachometer generator TG to produce proper operation, and this is accomplished by operating relay 17CR in parallel with relay 14CR (as above noted) to effectively reverse the polarity of the connections to tachometer generator TG in the series circuit including the potentiometer 12P and the control grid of tube 7VB.

When relay 15CR is released (which, as above noted, occurs when neither relay 13CR nor relay 14CR is operated) the potentiometer 12P and the tachometer generator TG are disabled to control vacuum tube 7VB over the previously discussed circuit. Under those conditions, means including potentiometer 14P are effective to establish and maintain equilibrium conditions in the control circuits in preparation for the next operation. Thus, with relays 13CR, 14CR and 15CR all released, the positive potential appearing at the wiper of potentiometer 12P is applied through contacts 15CRc, through a portion of the resistive element of potentiometer 14P and the wiper thereof, through contacts 15CRd, and through resistor 27R to the control grid of tube 7VB. The resistive element of potentiometer 14P is connected between the positive and negative terminals of the full-wave bridge rectifier including elements 22REa–22REd, so that an opposing voltage is developed across the resistive element of that potentiometer. The resultant voltage is applied to the control grid of tube 7VB. If for any reason that voltage tends to be higher than that preselected by the settings of potentiometers 12P and 14P, increased current will flow through tube 8V, and an increased potential will be developed across the aforesaid full-wave bridge rectifier and applied across the resistive element of potentiometer 14P to reduce and control the magnitude of the voltage applied between the control grid and cathode of triode 7VB.

In practice, potentiometer 14P is desirably set so that the voltage applied to the control grid of tube 7VB is about the same as that which will be applied to that control grid when the tachometer generator TG is being driven at the speed selected by the setting of potentiometer 12P.

It will be observed that the voltage applied across the motor M is also developed across the potentiometer 14P when the motor is operating. In the disclosed arrangement, this voltage is not applied to the control grid of tube 7VB since contacts 15CRb are open when the motor M is running. If desired, a switch 8SW may be connected in series with the winding of relay 15CR (FIG. 7) to selectively disable that relay to operate. In that case, contacts 15CRa and 15CRb will not close, so that the tachometer generator TG will not be connected to tube 7VB, and relay contacts 15CRc and 15CRd will remain closed so that voltage developed across a portion of the potentiometer 14P will be connected in series with the voltage selected by the potentiometer 12P to the control grid of tube 7VB. Therefore, in this arrangement, the feed-back signal will be derived from the armature voltage appearing across the motor M. It will be seen that by selectively enabling or disabling relay 15CR, the feed-back signal for regulation of the speed of the motor M may be derived either from a tachometer generator or from the armature voltage, as desired.

It will be observed that the energizing circuits for the motor M include not only normally open contacts 13CRa and 13CRb, of relay 13CR and normally open contacts 14CRa and 14CRc of relay 14CR, to produce the normal reversing operation, but also include normally closed contacts 13CRb and 14CRb, with the normally closed contacts 13CRb being connected in series with normally open contacts 14CRa and normally closed contacts 14CRb being connected in series with normally open contacts 13CRc and with the dynamic braking resistor 50R being connected to the junctions of those pairs of contacts. It is normally intended and expected that relays 13CR and 14CR will be energized only alternatively and in the circuits of FIG. 7 are so arranged. However, it is possible that in use, both relays would remain effectively operated at the same time either due to circuit malfunctioning, or more commonly, due to the closed contacts of one of the relays sticking or welding. This condition, of course, would produce a short circuiting of the power supply including the rectifiers 22REa through 22REd. To avoid this malfunctioning, it is customary to provide mechanically interlocked relays so that neither can operate unless the other is released. By virtue of the provision of the additional two sets of normally closed contacts 13CRb and 14CRb, the additional expense of providing mechanically interlocked relays is obviated. Thus, for example, if relay contacts 14CRa and 14CRc remain closed after the actual (due to contact welding) or ostensible (due to circuit malfunctioning) de-energization of relay 14CR, and if relay 13CR is thereafter operated to close contacts 13CRa and 13CRc, the power supply cannot be shorted through contacts 13CRa and 14CRa since contacts 13CRb are now open, and the power supply cannot be shorted through contacts 14CRc and 13CRc since contacts 14CRb are now open.

The program timer of FIGS. 9 and 10 comprises a driving amplifier V4, a plurality of timing amplifiers V5, V12A, and V12B, a plurality of counter tubes V1, V2 and V3, and a plurality of coincidence circuits including thyratrons V6, V7, V8, V9 and V10. In these circuits, a source of direct voltage is represented as a circle and it is to be understood that the other terminal of each such illustrated source is connected to ground.

The counters V1, V2 and V3 are representatively illustrated to be cold cathode glow transfer or stepping tubes which may, for example, be of the type manufactured by Ericson Telephone Ltd., of Great Britain, type GS10C. These tubes are commercially available in the United States of America. In general, each of these stepping tubes, such as stepping tube V1, comprises a plurality of cathodes designated 1–10, inclusive, an anode 200 common to all those cathodes, and a first and second plurality of intermediate, transfer or guide electrodes interposed the main cathodes Nos. 1–10. Since the electrodes in each of these groups of intermediate electrodes are electrically interconnected, the two groups of electrodes are, for convenience of illustration, designated as single electrodes 211 and 212.

The anode 200 is connected through resistor R15 to a source of positive direct potential on conductor 215, the main cathodes Nos. 1–9 are connected to ground through individual load resistors R29–R37, and main cathode No. 10 is connected to "zero line" 217 through resistor R33. The tube is designed so that with the properly selected value of resistor R15, discharge can be supported, at any one time, between the anode and but one of the main cathodes Nos. 1–10 so that the tube will commutate. The discharge path is advanced so that it exists between the anode and the successive cathodes by applying suitable pulses to the transfer or guide electrodes 211 and 212, the direction of advance being selected by the sequence of pulsing of those two groups of electrodes.

In the disclosed arrangement, the tube is initially set so that conduction exists between anode 200 and main cathode No. 10, and the discharge path is advanced from cathode to cathode in numerical order, the discharge first transferring from cathode No. 10 to cathode No. 1, thence to cathode No. 2 and so forth. This is accomplished by applying a pulse to transfer electrodes 212 slightly in advance of the application of a pulse to transfer electrodes 211. It will be appreciated that other forms of counting devices may be employed, that other forms of cold cathode gaseous discharge counting tubes may be employed, and that if the direction of discharge advance is established inherently in the tube by the construction and configuration of the cathodes or otherwise, the necessity for providing two time-phased input pulses can be avoided.

As will be seen, the function of tube V1 and of the other counter tubes disclosed, is to count a plurality of serially received input pulses and to transmit output signals whenever selected numbers of those pulses have been received. The sixty-cycle alternating line source is utilized as a pulse source in the present system so that the counters in effect count cycles of the sixty-cycle line frequency.

Prior to the closure of switch SW11, relay CR1 is released and its contacts CR1c are open. Consequently, a potential of approximately 150 volts negative (relative to ground) is applied to the "zero line" 217. As a result, the No. 10 cathodes of the counter tubes V1, V2 and V3 are returned to a source of quite negative potential relative to the ground potential to which the other cathodes of those tubes are returned. This selective application of a high negative potential to the No. 10 cathodes, in conjunction with the application of the high negative potential to the other elements connected to the zero line (as will become apparent from the ensuing description) results in each of the counter tubes being initially set to a condition in which the conduction exists between the anode and the No. 10 cathode thereof.

When line switch SW11 is closed, the source of alternating potential S5 is connected across the primary windings of transformers T1 and T2, with no present operational effect. However, when the initiating switch or contacts 6CRd are closed, the energizing circuit for relay CR1 is completed and that relay operates. Relay CR1, upon operating, closes its contacts CR1a to connect a positive direct voltage to conductor 216 over which it is supplied through load resistor R7 to the anode of thyratron V4, through resistor R65 and the winding of relay CR2 to the anode of thyratron V6, through resistor R70 and the winding of relay CR3 to the anode of thyratron V7, through resistor R5 and the winding of relay CR4 to the anode of thyratron V8, through resistor R80 and the winding of relay CR5 to the anode of thyratron V9, through resistor R85 and the winding of relay CR6 to the anode of thyratron V10, and across a voltage divider circuit to be described. Relay CR1, in operating, also closes its contacts CR1c to connect the "zero line" to ground to relieve the normalizing signal and enable the circuit to operate.

When the circuit is in operation, pulses derived from the alternating voltage supply are applied to the transfer electrodes of the counter tube V1 by means including tube V5. Tube V5 is a pentode the cathode and suppressor grid of which are grounded, the anode of which is connected through plate resistor R11 to a positive direct voltage on conductor 214 and the screen grid of which is connected through the secondary winding of transformer T2 in series with resistor R3 to a source of negative potential indicated on the drawings to have a magnitude of a negative 100 volts. Transformer T2 is preferably a peaker type transformer in which the core has an air gap so that there will be no effective breakdown of flux thereacross until the voltage appearing across the primary winding reaches a preselected value. This feature, coupled with the application of a large negative biasing voltage through resistor R3, results in the application of a positive pulse of energy to the screen grid of vacuum tube V5 at, or approximately at, the 90° point on the positive half-cycle of the alternating voltage wave form appearing across the primary winding of transformer T2. However, for reasons that will become apparent hereinafter, it is desirable that no such pulses be applied to the screen grid of tube V5 unless the coincidence circuit including thyratron V10 is nonconductive. Therefore, the screen grid of tube V5 is connected through resistor R8 to the anode of thyratron V10. If thyratron V10 is conductive, its anode potential is lower than the potential on conductor 216 due to the drop across resistor R85 and the winding of relay CR6, and the algebraic sum of the negative one hundred volt potential applied through resistor R3, of the relatively low positive potential applied through resistor R8, and of the positive pulse developed across the secondary winding of transformer T2 is not sufficient to cause vacuum tube V5 to produce the requisite output signal, even if other conditions are met. However, if thyratron V10 is extinguished, the positive potential at its anode is substantially equal to the positive potential on conductor 216 and the resultant voltage is applied through resistor R8 to the screen grid of vacuum tube V5 and is such that the algebraic sum of the voltages applied to that screen grid at the positive peak of the voltage developed across transformer T2 is sufficient to actuate tube V5. Thus, non-conductivity of thyratron V10 is a condition precedent to the effective operation of vacuum tube V5.

The circuits connected to the control grid of tube V5 also establish another condition precedent to its effective operation. Thus, that control grid is connected to a source of negative potential (representatively negative 20 volts) through the resistance network comprising resistors R9 and R10, and is connected to ground through the cathode resistor R6 of thyratron V4 and uni-directional current conducting device RE19. When thyratron V4 is non-conductive, therefore, a negative bias is applied between the control grid and cathode of vacuum tube V5 to prevent the effective production of output signals by that tube.

Thyratron V4 is initially disabled because its plate circuit is open at contact CR1a of relay CR1. When relay CR1 operates, closing contacts CR1a, the output circuit of thyratron V4 is energized, but thyratron V4 will not immediately fire due to a provision of a short time delay to ensure that relay CR1 has operated and that any chattering of its contacts have dissipated to prevent any improper operation of vacuum tube V5. Thus, the alternating voltage applied across the primary winding of transformer T1 upon the closure of switch SW11 will induce an alternating voltage across the secondary winding of that transformer which is applied across serially interconnected resistors R1 and R2. The voltage across resistor R1 is half-wave rectified by means including rectifier RE1, which is connected in series with normally-closed contacts CR1b of relay CR1. This rectified voltage is filtered by and developed across resistor R4 in parallel with capacitor C1, and the polarization of rectifier RE1 is such that the right hand terminal of resistor R4 will be negative relative to the left hand terminal thereof. The alternating voltage appearing across resistor R2 is applied in series with the negative direct voltage appearing across resistor R4 to the control grid of thyratron V4 through current limiting resistor R5. The magnitude of the direct voltage across resistor R4 is sufficient to prevent tube V4 from firing even with plate voltage applied. When relay CR1 operates to open contacts CR1b, the rectifying circuit including rectifier RE1 is disabled, but a hold-off voltage will continue to be applied to the control grid of thyratron V4 until capacitor C1 is adequately discharged through resistor R4. When the charge on capacitor C1 is dissipated to a preselected value, thyratron V4 will be fired as the alternating voltage across resistor R2 increases in a positive direction. In the preferred arrangement, transformers T1 and T2 are so connected that the voltage at the upper end of the secondary winding of transformer T2 is 180° out of phase with voltage at the upper end of the secondary winding of transformer T1. Thus thyratron V4 will be fired during a half cycle of the supply during which no positive pulse is being applied to the screen grid of tube V5. In this fashion, thyratron V4 is fired approximately 180° before the next positive pulse will be applied to the screen grid of tube V5.

When thyratron V4 fires, the potential at its cathode rises due to the potential drop across resistor R6, correspondingly raising the potential at the junction of resistors R9 and R10 and thereby applying a voltage to the tube V5 which will enable that tube to operate in response to the positive pulses applied to its screen grid.

After the foregoing conditions precedent to the effective operation of vacuum tube V5 are met, a negative-going pulse will appear at the anode of tube V5 at each positive pulse supplied to the screen grid thereof. These negative-going pulses are applied through capacitor C4 and through serially interconnected resistors R12 and R14 to a source of relatively low positive potential. Since transfer cathodes 212 are connected at the junction of resistors R12 and R14, their potential will be sharply reduced at each such pulse, producing a transfer of the discharge within the counter tube V1 so that it exists between the anode 200 and the transfer electrode 212 which is adjacent the last conducting cathode, in the initial condition, cathode No. 10.

Each of the series of negative-going pulses at the anode of tube V5 is further applied through capacitor C4, resistor R13, and capacitor C6 to ground, with the transfer electrodes 211 being connected to the junction of resistor R13 and capacitor C6. The time constant of the network including elements R13 and C6 is selected so that the application of a negative-going pulse to the transfer electrodes 211 will be delayed for an appropriate interval relative to the time that the pulses are applied to the transfer electrodes 212. At each such application, the discharge path in tube V1 is transferred so that it exists between the anode 200 and the next adjacent transfer electrode 211 and, upon the termination of the negative pulse to transfer electrodes 211, conduction is established between anode 200 and the next succeeding main cathode, following initial condition, cathode No. 1. Successive pulsing of transfer electrodes 212 and 211 will cause the conductive path to advance along the series of main cathodes.

At the tenth input pulse, the conductive path will be transferred so that it exists between the anode 200 and the No. 10 cathode of "units" counting tube V1. The resultant sudden increase in the potential at that cathode results in the application of a positive pulse to the control grid of vacuum tube V12A via the network comprising capacitor C8 and resistor R17. In response thereto, vacuum tube V12A will apply a negative pulse to transfer electrodes 222 of the "tens" counter V2 by means of the network including capacitor C9 and resistors R19 and R21 and will, a short delay thereafter, apply a negative-going pulse to the transfer electrodes 221 of the counter tube V2 by means including capacitors C9 and C11 and resistor R20. In response to these time-spaced pulses applied to transfer electrodes 222 and 221 of the tens counter tube V2, the conductive path therein will be transferred so that it exists between the anode and the No. 1 cathode thereof.

The next succeeding or eleventh input pulse will cause the conductive path in the "units" counter tube V1 to again step to the No. 1 cathode of that tube and succeeding pulses will cause the units tube V1 cyclically to count. Each time that the conductive path in the tube includes the No. 10 cathode of that tube, an output or "carry" pulse will be transmitted to advance the conductive path in the "tens" counter tube V2 one step.

At the hundredth input pulse, the conductive path in the "tens" tube V2 will be advanced to exist between the anode and the No. 10 cathode thereof, which will cause a positive pulse to be applied to the control grid of tube V12b which will result in the application of a counting signal to the "hundreds" counter tube V3 in a manner similar to that above described. In this fashion, one-thousand input pulses can be counted by providing units, tens and hundreds counter tubes cascaded as illustrated.

Each of the cathodes of the "units" counter tube V1 is connected to each corresponding stationary contact of each of a plurality of selector switches SW1, SW4, SW7, SW10 and SW13, each of the main cathodes of the "tens" counter tube V2 is connected to a corresponding one of the stationary contacts of a plurality of selector switches SW2, SW5, SW8, SW11 and SW14, and each of the main cathodes of the hundreds tube V3 is correspondingly connected to each corresponding stationary contact of each of a plurality of selector switches SW3, SW6, SW9, SW12 and SW15.

The concidence circuits including thyratrons V6–V10 serve to detect the concurrence of conductivity at each of three selected main cathodes of the three counter tubes V1, V2 and V3. Thus, each of the thyratrons V6–V10 will be fired at an individually preselectable count. Each of these coincidence circuits, such as the coincidence circuit including thyratron V6, includes three unidirectional current conducting devices such as diodes RE4, RE5 and RE6 which may be characterized as the "units," "tens," and "hundreds" diodes in that they are connected through the stepping switches to selected cathodes of the "units," "tens" and "hundreds" counter tubes V1, V2 and V3. Diode RE4 is connected to the wiper of selector switch SW1 which, in the illustrated setting, is connected to the No. 4 stationary contact of that selector switch and hence is connected to the No. 4 cathode of counter tube V1. Diode RE5 is connected to the wiper of selector switch SW2, which in the illustrated setting is connected to the No. 3 contact of that switch and hence to the No. 3 cathode of the "tens" counter tube V2, and diode RE6 is connected to the wiper of switch SW3 which is shown to be positioned in association with the No. 2 contact thereof and hence is connected to the No. 2 main cathode of tube V3. As a result, in the illustrated settings, thyratron V6 is arranged to be fired at the two-hundred and thirty-forth input pulse. The setting, of course, is purely arbitrary and may be varied as desired in accordance with the timing functions sought to be performed.

Similarly, the diodes RE7, RE8 and RE9 are associated with selector switches SW4, SW5 and SW6 so that thyratron V7 will be fired, as a representative example, at a different preselected total count of the input pulses. Thyratrons V8, V9 and V10 are also elements of coincidence circuits including individual diodes connected to individual selector switch banks in a corresponding fashion.

Since relay CR1 is operated, a circuit is completed from a source of positive 200 volt potential, through contacts CR1a, conductor 216, resistor R59, and resistor R60, to ground through contacts CR1c. As a result, a positive potential appears at conductors 224. At any time that the main cathode to which diode RE4, RE5, or RE6 is not an element of the conductive path in that counter tube, that cathode is essentially at ground potential and current will flow from conductor 224, through resistor R61, through that diode, to that cathode and to ground through the cathode resistor. In the preferred arrangement, resistor R61 has a quite high value of resistance so that the voltage appearing at the cathodes of the diodes RE4–RE6 under this circumstance is quite low. This relatively low positive potential is applied in series with a negative 20 volt potential across voltage dividing resistors R97 and R62 and the resultant voltage appearing at the junction of resistors R97 and R62 is applied through current limiting resistor R63 to the control grid of thyratron V6. The magnitude of this potential is insufficient to fire thyraton V6, and the parameters of the circuits are selected so that the potential applied to the control grid of thyratron V6 will not be adequate to permit that thyratron to fire as long as the cathode to which any one of the rectifiers RE4–RE6 is connected is not an element of the conductive path in the associated counter tube. Therefore, in the illustrated arrangement, at but only at the preselected count, all three of the counter-tube cathodes to which the diodes RE4–RE6 are then selectively connected are supporting conduction and are at a potential which is positive relative to ground. As a result, rectifiers RE4–RE6 will present an appreciably higher impedance to the flow of current from conductor 224 through resistor R61 via the previously traced circuits. The voltage drop across resistor R61 will accordingly fall and the potential applied to the control grid of thyratron V6 will correspondingly rise to a value sufficient to fire that thyratron. When thyratron V6 fires, relay CR2 included in its plate circuit, will be energized and will remain energized until relay CR1 is released.

In a similar manner, thyratron V7 will be fired at a preselected count to operate relay CR3, thyratron V8 will be actuated at a preselected count to operate relay CR4, thyratron V9 will be actuated at a preselected count to operate relay CR5, and thyratron V10 will be actuated at a preselected count to energize relay CR6.

The sharp reduction in plate potential of thyratron V10 resulting from the conductivity thereof, is applied to resistor R8 to terminate the operation of vacuum tube V5. This terminates operation of the counting circuit. Therefore, while the contacts of relays CR2–CR6 may be connected in any fashion to perform any desired function and while there is no necessary order in which those relays become operated, resistor R8 should be connected to the anode of the last one of the employed thyratrons which is to be fired. With the illustrated connection, it is assumed that relay CR6 is to operate at the highest count.

In the arrangement illustrated in FIGS. 1–5 of the drawings, the sensing of the position of the tip of the filler wire is accomplished electrically. In the embodiment of FIG. 11, this sensing is also accomplished electrically, by detecting the point of engagement of the filler wire with a filler wire nozzle 326 which is positioned in a preselectable relationship to nozzle 14.

In the arrangement illustrated in FIG. 11 of the drawings, the fragmentarily illustrated arc spot gun 300 is provided with an electrode 301 disposed within a hollow nozzle 302 engageable with the workpiece and having one or more apertures, such as aperture 304, in the side wall thereof. In this case, the aperture is an enlarged slot extending to the forward face of the nozzle 302, as distinguished from the arrangement of FIGS. 1–5 in which the aperture is a hole in the side wall of the nozzle. The term "aperture" is intended to be generic. A support bracket 306 is slidably connected to the gun 300 as by means of a screw 308 and slide 310. A wire guide assembly 312 is pivotally connected to bracket 306 by means of a pair of trunnions including trunnion 314. A wire feed tube assembly 316, comprising a casing 318, a tube 319, and a hollow guide liner 320 carrying the feed wire 322, is secured to the rear of assembly 312. The wire 322 is driven by a motor assembly (such as the assembly illustrated in FIGS. 1–5) through liner 320, through an insulating sleeve 324 disposed within assembly 312, and through a metallic wire feed nozzle 326 threadedly connected to the end of assembly 312. Nozzle 326 directs the wire 322 through aperture 304. The assembly 312, and hence the nozzle 326, may be locked in selected angular position by means of an adjusting nut 330 which is threaded on the rear end of assembly 312 and which forces a pointer assembly 331 into abutment with a surface of bracket 306. Bracket 306 is desirably also adjustable longitudinally of the gun so that the angle of feed of the wire may be adjusted while yet permitting the feed wire to be directed so that it will intersect the plane of the face of the nozzle about in alignment with the near edge of the electrode 301, as illustrated. In a constructed arrangement, the angle of feed was adjustable from an angle of 10° from the plane of the face of nozzle 302, as illustrated, to about 35°, as indicated by axis 332.

While the aperture 304 can be designed so that the tip of the filler wire 322 contacts nozzle 302 and permits electrical sensing of the location of the tip of the filler wire in a manner similar to that described in connection with FIGS. 1–5, in the illustrated arrangement the preselected position of the tip of the filler wire 322 is, as illustrated, at the point of its electrical engagement with wire feed nozzle 326, that is, just as it leaves sleeve 324 and contacts nozzle 326. The position sensing circuit, in this arrangement, includes the wire 322, nozzle 326, bracket 306, and the gun 300, and controls the energization of relay 16CR (FIG. 7), for example.

This embodiment, as the first described embodiment, permits accurate control of the amount of filler wire introduced into the weld puddle. It is contemplated that the selected position of the tip of the filler wire may also be sensed mechanically, as by a limit-switch arm 340 (FIG. 12) engageable with and movable by the tip of the filler wire 322' at a selected position, as schematically illustrated in FIG. 12, pneumatically, as by employing a sensing apparatus 342 to sense when the flow of air, or better, argon, from a source 344 and through transversely aligned apertures 346–348 (FIG. 13) in the tube 90', for example, is interrupted or permitted by the wire 322" as schematically illustrated in FIG. 13, or otherwise. In any such case, the sensing means may control relay 16CR (FIG. 7).

While it will be apparent that the embodiments of the invention herein disclosed are well calculated to fulfill the objects of the invention, will be appreciated that the invention is susceptible modification, variation and change without departing from the proper scope or fair meaning of the subjoined claims.

What is claimed is:

1. In an arc welding apparatus in which filler wire is supplied to the weld puddle, a hollow electrically conductive nozzle, a nonconsumable electrode within said nozzle, an aperture in the side wall of said nozzle of substantially the same diameter as the filler wire having a portion electrically engageable with the filler wire and a portion for supporting the wire in insulating relation to the nozzle, motor control means responsive to electrical engagement and disengagement of said filler wire with the electrically conductive portion of said nozzle, and motor means controlled by said motor control means for driving the filler wire through said aperture.

2. The combination of claim 1 in which said aperture is inclined at an angle of approximately 20 degrees to the plane of the face of the nozzle.

3. The combination of claim 1 further including means for electrically insulating the filler wire from said nozzle except solely as a result of direct electrical enegagement between the filler wire and the walls of said aperture.

4. The combination of claim 3 further including a guide member secured to said nozzle and having a longitudinal bore aligned with said aperture, and an insulating member disposed within the bore in said guide member and having a longitudinal bore aligned with said aperture in said nozzle and having a diameter substantially equal to the diameter of the filler wire.

5. The combination of claim 4 in which said filler wire makes electrical engagement with the walls of said aperture in said nozzle when the wire is advanced to project from said insulating member into said aperture in said nozzle.

6. The combination of claim 3 further including detecting means for detecting electrical engagement between the filler wire and the walls of said aperture in said nozzle.

7. In an arc welding apparatus, a hollow metallic nozzle, a consumable metallic member movable relative to said nozzle member and engageable therewith in the course of its travel, means for insulating said consumable member from said nozzle member except upon engagement therebetween, means for advancing said consumable member relative to said nozzle member, and means responsive to electrical engagement between said consumable member and said nozzle member for controlling said advancing means.

8. The method of accurately controlling the amount of filler wire introduced into a weld puddle during an arc spot welding operation which comprises the steps of electrically sensing an accurate initial position of the tip of the filler wire, advancing the filler wire into the weld puddle at a controlled rate for a preselected period of time, and retracting said filler wire at the end of that time.

9. In an arc welding apparatus in which filler wire is supplied to the weld puddle, a hollow nozzle, a nonconsumable electrode within said nozzle, an aperture in the side wall of said nozzle of substantially the same diameter as the filler wire, a driving motor rotatable at a speed determined by the magnitude of the voltage applied thereacross for advancing and retracting said filler wire, means for detecting the voltage applied across said motor, a tachometer generator coupled to and driven by said motor, a source of reference voltage, a source of energizing voltage for said motor, control means for controlling the magnitude of the voltage applied across said motor from said source of energizing voltage, selectively manually operable switch means having two positions, means controlled by said switch means and effective when said switch means is in one of said positions for controlling said control means in accordance with the combination of said reference voltage and the output voltage of said tachometer generator, means controlled by said switch means and effective in the other position of said switch means for controlling said control means in accordance with the combination of said reference voltage and the voltage appearing across said motor and means including said motor for driving the filler wire through said aperture.

10. In an arc welding apparatus in which filler wire is supplied to the weld puddle, a hollow nozzle, a nonconsumable electrode within said nozzle, guide means including electrical insulating means for guiding the said wire adjacent said nozzle and for electrically insulating the wire from said nozzle, drive means for driving the wire through said guide means and into electrical engagement with said nozzle, and means responsive to the electrical engagement of the wire with said nozzle for controlling said drive means.

11. The combination of claim 10 in which said guide means supports the wire at an angle with respect to the axis of the nozzle in which the tip of the wire intersects the plane of the face of the nozzle substantially in line with the edge of said electrode.

12. In an arc welding apparatus, a nozzle engageable with a workpiece and having an aperture in a side wall thereof, means for supplying filler wire through the aperture in said nozzle at a preselected rate, a nonconsumable electrode within said nozzle, means for striking an arc between said electrode and the workpiece, timing means for controlling the time during which the filler wire is advanced through the aperture in the nozzle, means effective in response to the initiation of the arc to initiate the operation of said timing means, and means responsive to the extinction of said arc to establish resetting of said timing means as a condition precedent to the reinitiation of the arc.

13. In an arc welding apparatus for welding a workpiece, a metallic nozzle engageable with the workpiece, an electrode within said nozzle, working voltage means for establishing a working direct voltage between said electrode and the workpiece, booster voltage means for establishing a direct voltage between said electrode and the workpiece which is high in magnitude relative to said working voltage, ionizing means for establishing a high-frequency ionizing voltage difference between said electrode and the workpiece, control means for causing said booster voltage and said ionizing voltage to be concurrently applied between said electrode and the workpiece, and control means effective while said working voltage means is operating for terminating the operation of said ionizing means and effective a preselected delay interval thereafter to terminate the operation of said booster voltage means.

14. In an arc welding apparatus for welding a workpiece, a metallic nozzle engageable with the workpiece, an electrode within said nozzle, working voltage means for establishing a working direct voltage between said electrode and the workpiece, booster voltage means for establishing a direct voltage between said electrode and the workpiece which is high in magnitude relative to said working voltage, ionizing means for establishing a high-frequency ionizing voltage difference between said electrode and the workpiece, control means for causing said booster voltage and said ionizing voltage to be concurrently applied between said electrode and the workpiece, and control means effective while said working voltage means is operating for terminating the operation of said ionizing means and effective a preselected delay interval thereafter to terminate the operation of said booster voltage means, said control means being effective in response to the establishment of an arc between said electrode and the workpiece and in response to the flow of current from said working voltage means through the arc.

15. In an arc welding apparatus for welding a workpiece, a metallic nozzle engageable with the workpiece, an electrode within said nozzle, working voltage means for establishing a working direct voltage between said electrode and the workpiece, voltage supply means having two output terminals for producing a voltage which is high in magnitude relative to said working voltage means for connecting one of said terminals to said electrode and manually actuatable means for alternatively connecting the other terminal of said voltage source means to said nozzle and to the workpiece, and ionizing means effective under the control of said manually actuatable means alternatively to apply a high-frequency ionizing voltage difference between said electrode and said nozzle and between said electrode and the workpiece.

16. In an arc welding apparatus in which filler wire is supplied to the weld puddle, a filler wire, a hollow electrically conductive nozzle, a nonconsumable electrode within said nozzle, an aperture in the side wall of said nozzle of substantially the same diameter as the filler wire having a portion electrically engageable with the filler wire, means for electrically insulating the filler wire from said nozzle except solely as a result of direct electrical engagement between the filler wire and the walls of said aperture, detecting means for detecting electrical engagement between the filler wire and the walls of said aperture in said nozzle, control means responsive to electrical engagement and disengagement of said filler wire with the electrically conductive portion of said nozzle, and means controlled by said control means for driving the filler wire through said aperture.

17. The method of accurately controlling the amount of filler wire introduced by an arc spot gun having a nozzle engageable with a workpiece into a weld puddle during each of a succession of arc spot welding operations which comprises the steps of establishing engagement between the nozzle and the workpiece, advancing the filler wire relative to the nozzle from an accurate initial position spaced from the weld puddle into the weld puddle at a controlled rate for a preselected period of time, and after said period of time removing said filler wire relative to the nozzle to move the tip of the filler wire to said accurate initial position, at least a portion of said movement being in a retracting sense to move the tip of the filler wire out of and away from the weld puddle to control burn off and ocurring while the nozzle is in engagement with the workpiece.

18. The method of claim 17 further including the step of establishing an arc between an electrode and a workpiece to form the weld puddle, and in which said advancing of the filler wire and said portion of said movement of the filler wire both occur prior to the termination of the arc.

19. The method of claim 17 in which said movement in a retracting direction terminates while the nozzle remains in engagement with the workpiece and when the tip of the filler wire reaches said initial position.

20. The method of claim 17 in which portion of said movement in a retracting direction occurs while said nozzle remains in engagement with a workpiece during one weld operation, and in which said movement of said filler wire includes further movement to said accurate initial position.

21. The method of claim 20 in which further said movement is in an advancing sense and occurs while said nozzle is in engagement with a workpiece preliminary to the next weld operation.

22. In an arc welding apparatus in which a weld puddle is formed on a workpiece as a result of an arc established between an electrode and the workpiece and in which filler wire is supplied to the weld puddle, a hollow metallic nozzle engageable with a workpiece and having an aperture through a side wall thereof and surrounding an end portion of the electrode, means for advancing the filler wire into preselected relationship with said nozzle, means effective thereafter for advancing a preselected amount of the filler wire through the aperture in said nozzle to positively control the amount of filler wire added to the weld puddle, and means effective when said preselected amount of filler wire has been advanced for retracting the remaining filler wire to preclude additional burn-off of said wire.

23. In an arc welding apparatus, a nozzle engageable with a workpiece and having an aperture in a side wall thereof, feed means effective when actuated for supplying filler wire through the aperture in said nozzle at a preselected rate, a nonconsumable electrode within said nozzle, means for striking an arc between said electrode and the workpiece, timing means effective a settable time after actuation for actuating said feed means, sensing means for sensing the initiation of the arc, and means controlled by said sensing means and effective in response to the initiation of the arc to actuate said timing means.

24. The combination of claim 23 further including second timing means for controlling the time at which the advance of said filler wire is terminated and means effective at the termination of said time and while the arc continues for retracting the filler wire.

25. In a motor control system, a reversible direct current motor rotatable in a direction determined by the polarity of the voltage applied thereto and having two terminals, a source of direct voltage having two terminals, first and second normally alternatively actuable switch means, said first switch means having first normally open and second normally closed and third normally open contacts the states of which are normally concurrently changed, said second separately operable switch means having first normally open and second normally closed and third normally open contacts the states of which are normally concurrently changed, means comprising said first and third contacts of said first switch means and said second contacts of said second switch means for connecting at one time one terminal of said source to one terminal of said motor and for connecting the other terminal of said source to the other terminal of said motor for driving said motor in one direction, said second contacts of said second switch means and said third contacts of said first switch means being connected in series with one another between one terminal at the motor and one terminal of the source, and means comprising said first and third contacts of said second switch means and said second contacts of said first switch means for connecting at one time said one terminal of said source to said other terminal of said motor and for connecting said other terminal of said source to said one terminal of said motor for driving said motor in the opposite direction, said second contacts of said first switch means and said third contacts of said second switch means being connected in series with one another between one terminal of the motor and one terminal of the source.

26. In an arc welding apparatus in which filler wire is supplied to the weld puddle, a hollow nozzle, a nonconsumable electrode within said nozzle, an aperture in the side wall of said nozzle, a reversible direct current motor rotatable in a direction determined by the polarity of the voltage applied thereto and having two terminals for advancing and retracting said filler wire, a source of direct voltage having two terminals, first switch means having first normally open and second normally closed contacts the states of which are concurrently changed, second switch means having first normally open and second normally closed contacts the states of which are concurrently changed, means for connecting said first contacts and said second contacts of said first switch means in series with one another across said source, means for connecting said first contacts and said second contacts of said second switch means in series with one another across said source, means for connecting one terminal of said motor to the junction of said first and second contacts of said first switch means, means for connecting the other terminal of said motor to the junction of said first and second contacts of said second switch means, means including said motor for driving the filler wire through said aperture, and control means for selectively and alternatively actuating said first and second switch means for controlling the advancing and retracting of the filler wire.

27. An arc welding machine for supplying precisely controlled amounts of filler wire to a weld comprising means for establishing an arc between an electrode and a workpiece, feed means for feeding a filler wire toward and away from the arc, and means including timing means and said feed means for moving the wire toward the arc for a selectable period then away from the arc while the arc continues to control filler wire burn-off.

28. An arc welding machine for supplying precisely controlled amounts of filler wire to a weld comprising means for establishing an arc between a nonconsumable electrode and a workpiece to puddle the workpiece, feed means for feeding a filler wire toward and away from the puddle in the workpiece, sensing means for detecting when the tip is in a preselected position, means including said feed means and said sensing means for moving the tip of the filler wire to said preselected position, and means including timing means and said feed means for moving the wire into the puddle for a selectable period followed by retraction of the wire out of the puddle while the arc continues to restrict filler wire burn-off.

29. An arc welding machine for supplying precisely controlled amounts of filler wire to a weld comprising means for drawing an arc between a nonconsumable electrode and a workpiece to puddle the workpiece, means comprising a reversible motor for feeding a filler wire toward and away from the weld puddle, and means for energizing said motor for a selectable period to feed a predeterminable amount of said filler wire into the weld puddle and thereafter energizing the motor in the reverse direction to retract the wire from the weld puddle to control filler wire burn-off while the arc continues.

30. An arc welding machine in accordance with claim 29 wherein said energizing means is deenergized upon retraction of said filler wire a predetermined amount with respect to the machine.

31. In an arc welding apparatus for welding a workpiece, a metallic nozzle engageable with the workpiece, an electrode within said nozzle, working voltage means for establishing a working direct voltage between said electrode and the workpiece, voltage supply means having two output terminals for producing a voltage which is high in magnitude relative to said working voltage, and means for connecting one of said terminals to said electrode and manually actuatable means for alternatively connecting the other terminal of said voltage source means to said nozzle and to the workpiece.

32. In a filler wire driving mechanism for an arc welding apparatus having a nozzle, the combination of a support bracket attachable to the apparatus and disposable in preselected relation to the nozzle, a reversible driving motor supported by said support bracket, a tachometer generator supported by said support bracket and drivingly coupled to said motor for producing an output signal which varies in accordance with the speed of said motor, a driving roller and an idle roller both engageable with the wire for driving the wire, means for drivingly connecting said motor to said driving roller, control means responsive to the output voltage from said tachometer generator for controlling the speed of said motor, and means for sensing when the tip of said filler wire is in preselected positional relationship with the nozzle, said control means further including means responsive to said sensing means for controlling the energization and deenergization of said motor for moving the tip of said filler wire to said preselected positional relationship with the nozzle.

33. In an arc spot welding apparatus having a hollow nozzle engageable with a workpiece, an aperture in the side wall of said nozzle, an electrode within said nozzle, means for establishing an arc between the electrode and the workpiece and a motor for moving filler wire through the aperture in the nozzle, the combination of sensing means for sensing when the tip of the filler wire is in preselected positional relationship to said nozzle, and control means including said sensing means and said motor for moving the tip of said filler wire into said preselected positional relationship with said nozzle.

34. The combination of claim 33 in which said sensing means includes means for sensing the electrical engagement of the tip of the filler wire with the hollow nozzle.

35. The combination of claim 33 further including a wire-feed nozzle proximate the hollow nozzle and directed to direct filler wire passing therethrough to pass through the aperture in the hollow nozzle, and means for electrically insulating said wire from said wire and nozzle when said wire is withdrawn therefrom, and in which said sensing means includes means for sensing the electrical engagement of the filler wire with said wire-feed nozzle.

36. The combination of claim 35 further including a support plate connected to said apparatus, and adjustable means supported by said support plate and supporting said wire-feed nozzle and adjustable to change the angle of feed of the feed wire through the aperture in the hollow nozzle.

References Cited by the Examiner
UNITED STATES PATENTS

| | | | |
|---|---|---|---|
| 788,539 | 5/1905 | Klopf | 200—61.42 X |
| 2,235,385 | 3/1941 | Rava | 219—131 |
| 2,360,160 | 10/1944 | Pickhaver | 219—130 |
| 2,394,111 | 2/1946 | Schaelchlin et al. | 318—293 |
| 2,460,990 | 2/1949 | Kratz et al. | 219—131 |
| 2,516,037 | 7/1950 | Williams | 219—75 X |
| 2,550,495 | 4/1951 | Pilia | 219—127 |
| 2,603,760 | 7/1952 | Kocher | 219—131 X |
| 2,731,536 | 1/1956 | Laur | 219—130 X |
| 2,752,469 | 6/1956 | Price | 219—131 |
| 2,761,049 | 8/1956 | McElrath et al. | 219—130 |
| 2,766,361 | 10/1956 | Landis et al. | 219—131 |
| 2,791,673 | 5/1957 | Arnaud | 219—74 |
| 2,892,925 | 6/1959 | Butterfield | 219—127 |
| 2,898,445 | 9/1959 | Slezak | 219—127 |
| 2,906,859 | 9/1959 | Steele | 219—130 |
| 2,922,871 | 1/1960 | Hackman et al. | 219—131 |
| 2,935,674 | 5/1960 | Hohne | 318—293 |
| 2,950,381 | 8/1960 | Brennen et al. | 219—127 |
| 2,957,977 | 10/1960 | Sullivan | 219—127 |
| 2,982,845 | 5/1961 | Yenni et al. | 219—75 X |
| 2,993,984 | 7/1961 | Sullivan | 219—131 |
| 2,998,507 | 8/1961 | Brenner et al. | 219—127 |

ANTHONY BARTIS, *Acting Primary Examiner.*

RICHARD M. WOOD, JOSEPH V. TRUHE, *Examiners.*

UNITED STATES PATENT OFFICE
CERTIFICATE OF CORRECTION

Patent No. 3,277,269                                October 4, 1966

Richard S. Zeller

It is hereby certified that error appears in the above numbered patent requiring correction and that the said Letters Patent should read as corrected below.

Column 1, line 53, for "conditioned" read -- condition --; column 3, line 36, for "is" read -- it --; line 52, for "the" read -- to --; column 8, line 2, for "13CR" read -- 12CR --; line 20, for "until is" read -- until it is --; line 48, for "the matter" read -- that matter --; line 73, for "prepaartion" read -- preparation --; column 10, line 22, for "buckling" read -- bucking --; column 13, line 7, for "R33" read -- R38 --; line 68, for "R5" read -- R75 --; column 18, line 51, after "invention " insert -- it --; line 52, after "susceptible" insert -- to --; line 73, for "enegagement" read -- engagement --; column 24, line 42, for "9/1959" read -- 8/1959 --.

Signed and sealed this 29th day of August 1967.

(SEAL)
Attest:

ERNEST W. SWIDER                                    EDWARD J. BRENNER
Attesting Officer                                  Commissioner of Patents